US010580036B2

(12) United States Patent
Craft

(10) Patent No.: US 10,580,036 B2
(45) Date of Patent: Mar. 3, 2020

(54) UNIVERSAL CONSUMER-DRIVEN CENTRALIZED MARKETING SYSTEM

(71) Applicant: Mack Craft, St. Augustine, FL (US)

(72) Inventor: Mack Craft, St. Augustine, FL (US)

(*) Notice: Subject to any disclaimer, the term of this patent is extended or adjusted under 35 U.S.C. 154(b) by 602 days.

(21) Appl. No.: 14/334,592

(22) Filed: Jul. 17, 2014

(65) Prior Publication Data

US 2014/0330645 A1 Nov. 6, 2014

Related U.S. Application Data

(63) Continuation-in-part of application No. 14/058,119, filed on Oct. 18, 2013, now abandoned.

(60) Provisional application No. 61/795,497, filed on Oct. 18, 2012.

(51) Int. Cl.
*G06Q 30/00* (2012.01)
*G06Q 30/02* (2012.01)

(52) U.S. Cl.
CPC .................. *G06Q 30/0255* (2013.01)

(58) Field of Classification Search
None
See application file for complete search history.

(56) References Cited

U.S. PATENT DOCUMENTS

| | | | | |
|---|---|---|---|---|
| 2002/0099556 A1* | 7/2002 | Xia | .......... | G06Q 20/20 |
| | | | | 715/206 |
| 2002/0171686 A1* | 11/2002 | Kamen | ........... | G06F 3/04815 |
| | | | | 715/850 |
| 2005/0203821 A1* | 9/2005 | Petersen | .......... | G06Q 30/0281 |
| | | | | 705/36 R |
| 2006/0085251 A1* | 4/2006 | Greene | ........... | G06Q 30/02 |
| | | | | 705/14.53 |
| 2007/0043709 A1* | 2/2007 | Strassmann | ............ | G06F 16/24 |
| 2008/0015938 A1* | 1/2008 | Haddad | ............ | G06Q 20/387 |
| | | | | 705/14.38 |
| 2008/0114607 A1* | 5/2008 | Amer-Yahia | ......... | G06Q 30/02 |
| | | | | 705/14.4 |
| 2008/0313040 A1* | 12/2008 | Rose | .................. | G06Q 30/02 |
| | | | | 705/14.69 |
| 2009/0076905 A1* | 3/2009 | Kraft | ................ | G06Q 30/02 |
| | | | | 705/14.25 |
| 2009/0287572 A1* | 11/2009 | Whelan | ............. | G06Q 30/02 |
| | | | | 705/14.55 |
| 2009/0319936 A1* | 12/2009 | Alva | ................ | G06Q 10/087 |
| | | | | 715/776 |
| 2010/0082778 A1* | 4/2010 | Muilenburg | ........... | G06Q 10/06 |
| | | | | 709/220 |
| 2011/0025816 A1* | 2/2011 | Brewer | ............... | G06Q 30/02 |
| | | | | 348/14.02 |

(Continued)

*Primary Examiner* — Matthew T Sittner
(74) *Attorney, Agent, or Firm* — Mark Young, P.A.

(57) ABSTRACT

A scalable adaptable consumer-driven centralized marketing system and methodology receives consumer directives, marketing directives and marketing objects from users. Each marketing object is associated with a marketing directive. A consumer directive provides consumer-related information, which may include a subject matter of interest. A marketing directive provides marketing subject matter, which may relate to goods or services offered. The system queries a database for consumer directives with subject matters of interest that match the marketing subject matter. The system makes a copy of the marketing object accessible to users associated with matching consumer directives.

2 Claims, 16 Drawing Sheets

(56) References Cited

U.S. PATENT DOCUMENTS

| | | | | |
|---|---|---|---|---|
| 2011/0078055 | A1* | 3/2011 | Faribault | G06Q 30/02 705/27.2 |
| 2011/0093323 | A1* | 4/2011 | Prus | G06Q 30/02 705/14.26 |
| 2011/0106613 | A1* | 5/2011 | Felt | G01C 21/00 705/14.46 |
| 2011/0106615 | A1* | 5/2011 | Churchill | G06Q 30/02 705/14.49 |
| 2011/0225034 | A1* | 9/2011 | Bayat | G06Q 30/02 705/14.36 |
| 2011/0282741 | A1* | 11/2011 | Park | G06Q 30/02 705/14.54 |
| 2012/0101944 | A1* | 4/2012 | Lin | G06F 21/554 705/44 |
| 2012/0130788 | A1* | 5/2012 | Winslade | G06Q 30/02 705/14.23 |
| 2012/0253943 | A1* | 10/2012 | Chow | G06Q 30/0255 705/14.69 |
| 2012/0284104 | A1* | 11/2012 | Keenan | G06Q 30/02 705/14.23 |
| 2013/0013401 | A1* | 1/2013 | Kim | G06Q 10/10 705/14.49 |
| 2013/0054320 | A1* | 2/2013 | Dorso | G06Q 30/0268 705/14.4 |
| 2013/0144715 | A1* | 6/2013 | Kranzley | G06Q 30/0251 705/14.49 |
| 2013/0211890 | A1* | 8/2013 | Heitmueller | G06Q 30/0207 705/14.13 |
| 2013/0311357 | A1* | 11/2013 | Kring | G06Q 30/0601 705/39 |
| 2014/0074833 | A1* | 3/2014 | Adams | G06F 16/28 707/736 |
| 2014/0330645 | A1* | 11/2014 | Craft | G06Q 30/0255 705/14.53 |
| 2017/0213243 | A1* | 7/2017 | Dollard | G06Q 30/0249 |

* cited by examiner

UNIVERSAL CONSUMER-DRIVEN CENTRALIZED MARKETING SYSTEM

RELATED APPLICATION

This application is a continuation-in-part and claims the benefit of priority of pending U.S. Nonprovisional application Ser. No. 14/058,119 filed 18 Oct. 2013, which is a Nonprovisional of and claims the benefit of priority of U.S. Provisional Application No. 61/795,497 filed on 18 Oct. 2012, the entire contents of which are incorporated herein by this reference and made a part hereof.

FIELD OF THE INVENTION

This invention relates generally to marketing, and, more particularly, to a networked system that directs advertising to users based upon user and marketing directives.

BACKGROUND

A problem with marketing, whether it involves a conventional advertisement, a coupon, a discount code, or some other form of marketing, is that it often reaches individuals and businesses who are not interested in the promoted business, product or service, and may fail to reach those who are truly interested. Thus, a business pays for broad distribution of an advertisement through print or electronic sources to many consumers, including many who may not be receptive to the advertisement. By way of example a business may publish coupons in a newspaper or other printed publication. Many of those coupons will not reach interested consumers. Many of those coupons will reach consumers lacking interest in the subject matter. While online coupon delivery systems have been devised, such systems are relegated to coupon delivery and still require a consumer to request specific coupons.

Online advertising uses the Internet to deliver promotional marketing messages to consumers. It includes email marketing, search engine marketing, social media marketing, many types of display advertising (including web banner advertising). Like other advertising media, online advertising frequently reaches consumers who are not interested in the content and fails to reach those who may be truly interested.

Online advertisers (typically through their ad servers) often use cookies, which are unique identifiers of specific computers, to decide which ads to serve to a particular consumer. Cookies can track whether a user left a page without buying anything, so the advertiser can later retarget the user with ads from the site the user visited. As advertisers collect data across multiple external websites about a user's online activity, they can create a detailed picture of the user's interests to deliver even more targeted advertising. Often the picture is inaccurate. This aggregation of data is called behavioral targeting. Online advertisers can also target their audience by using contextual and semantic advertising to deliver display ads related to the content of the web page where the ads appear. Re-targeting, behavioral targeting, and contextual advertising all are designed to increase an advertiser's return on investment, or ROI, over un-targeted ads.

A problem with such online advertising is that it assumes, often erroneously, that a consumer's web search or a visit to a site or clicking of a hyperlink means that the consumer is interested in the subject matter. This is not always the case. Often, individuals visit online sites and select links inadvertently, mistakenly or indiscriminately, without an interest in the underlying subject matter. Occasionally, a consumer's interest may be transient. By way of example, after a consumer completes the purchase of a new home, that consumer may no longer be interested in home inspection services, notwithstanding prior web searches and online visits to websites promoting such services. In such a case, advertising dollars are squandered and the consumer is alienated if targeted banner ads continue to promote home inspection services to the consumer.

A related problem is unsolicited commercial email, often referred to as SPAM. Such email is often sent indiscriminately to all users on a list, regardless of their interests. Not only does such email consume storage and bandwidth, but it infuriates many consumers. Concomitantly, many email applications do a good job at identifying such email as SPAM and move them to a junk folder or delete them upon receipt. Thus, a consumer may never even see such email.

The invention is directed to overcoming one or more of the problems and solving one or more of the needs as set forth above.

SUMMARY OF THE INVENTION

To solve one or more of the problems set forth above, in an exemplary implementation of the invention, a consumer-driven centralized marketing system includes a centralized processing engine, a directive repository and a marketing object repository. Participating users may submit directives to the processing engine. Each directive comprises an authoritative instruction pertaining to delivery of electronically deliverable marketing object. A directive may be a consumer directive or a marketing directive. A consumer directive may be one of many different types including, a location directive, a personal information directive, a general directive and a specific directive. A personal information directive may provide a user's gender, race, age, income level, profession, and personal interests to facilitate delivery of marketing objects pertaining thereto. A general directive remains active until canceled. A specific directive and marketing directive instructs the system to which consumers the system should send a particular marketing object. The centralized processing engine saves each received directive as a record in a database referred to as a directive repository. A marketing object may be provided by the user or a third party. A marketing object may comprise any of a wide variety of marketing items, such as coupons, announcements, advertisements, promotional codes, job postings, resumes, personal profiles, etc. . . . The centralized processing engine may save each received marketing object as a record in a database. In the case of a marketing object provided by a user, a marketing directive provided by that user for the marketing object may specify to whom and when the marketing object may be distributed via the system. A consumer directive instructs the system to deliver certain types of marketing objects to the user via the system.

As used herein, the term coupon broadly encompasses any type of object, tangible or intangible, that can be exchanged for a financial discount or rebate when purchasing a product or service, including but not limited to "coupon codes", "promotional codes", "promotion codes", "discount codes", "key codes", "promo codes", "surplus codes", "portable codes", "shopping codes", "voucher codes", "reward codes", "discount vouchers", "referral codes," as well as any other financial benefit to reward or induce a purchase.

The system includes a portal for users to access features of the system. The portal may be accessed via a web page and/or an app. Through the portal, a user may create a directive and/or provide a marketing object. The portal may provide user-navigable forms to facilitate directive creation and marketing object submission.

The system may receive location information from users in the form of a location directive. Location information may comprise a home address, a business address, one or more other addresses, zip code, or a current location of the user as determined from location data such as GPS data from a user's smart-phone or other electronic device. The system may utilize a location directive to provide local marketing objects responsive to a directive to a consumer-user.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to illustrate every embodiment of the invention. The invention methodology is not limited to the exemplary implementations depicted in the figures or the specific components, configurations, steps, or order of steps as shown in the figures. The text assigned to flowchart steps and block diagram elements are provided for reference purposes and not intended to limit any such element, step or the invention.

DETAILED DESCRIPTION

An implementation of the present invention may be embodied in hardware and/or in software (including firmware, resident software, micro-code, etc.). Furthermore, the present invention may take the form of one or more computer program products on one or more computer-usable or computer-readable storage media having computer-usable or computer-readable program code embodied in the media for use by or in connection with an instruction execution system. A computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific non-limiting examples (a non-exhaustive list) of a computer-readable medium include random access memory (RAM), a read-only memory (ROM), an erasable programmable read-only memory (EPROM or Flash memory), a hard disk drive, a solid state drive, a portable compact disc read-only memory (CD-ROM), a Blu-ray disc (BD).

Computer program code or "code" for carrying out operations (e.g., steps) according to the present invention may be written in any programming language compatible with the corresponding computing devices and operating systems. Software embodiments of the present invention do not depend on implementation with a particular programming language.

The computer program code may be provided to a processor of a general-purpose computer, special purpose computer, or other programmable computing apparatus (e.g., a phone, personal digital assistant, tablet, laptop, personal computer, or computer server) as instructions to produce a machine, such that the instructions, which execute via the processor of the computer or other programmable data processing apparatus, create means for implementing the functions specified in the illustrations. The computer code may be stored in a computer-readable memory that can direct a computer or other programmable data processing apparatus to function in a particular manner, such that the instructions stored in the computer-readable memory produce an article of manufacture including instruction means which implement the functions and perform the steps specified in the illustrations and described herein.

Figure 1:
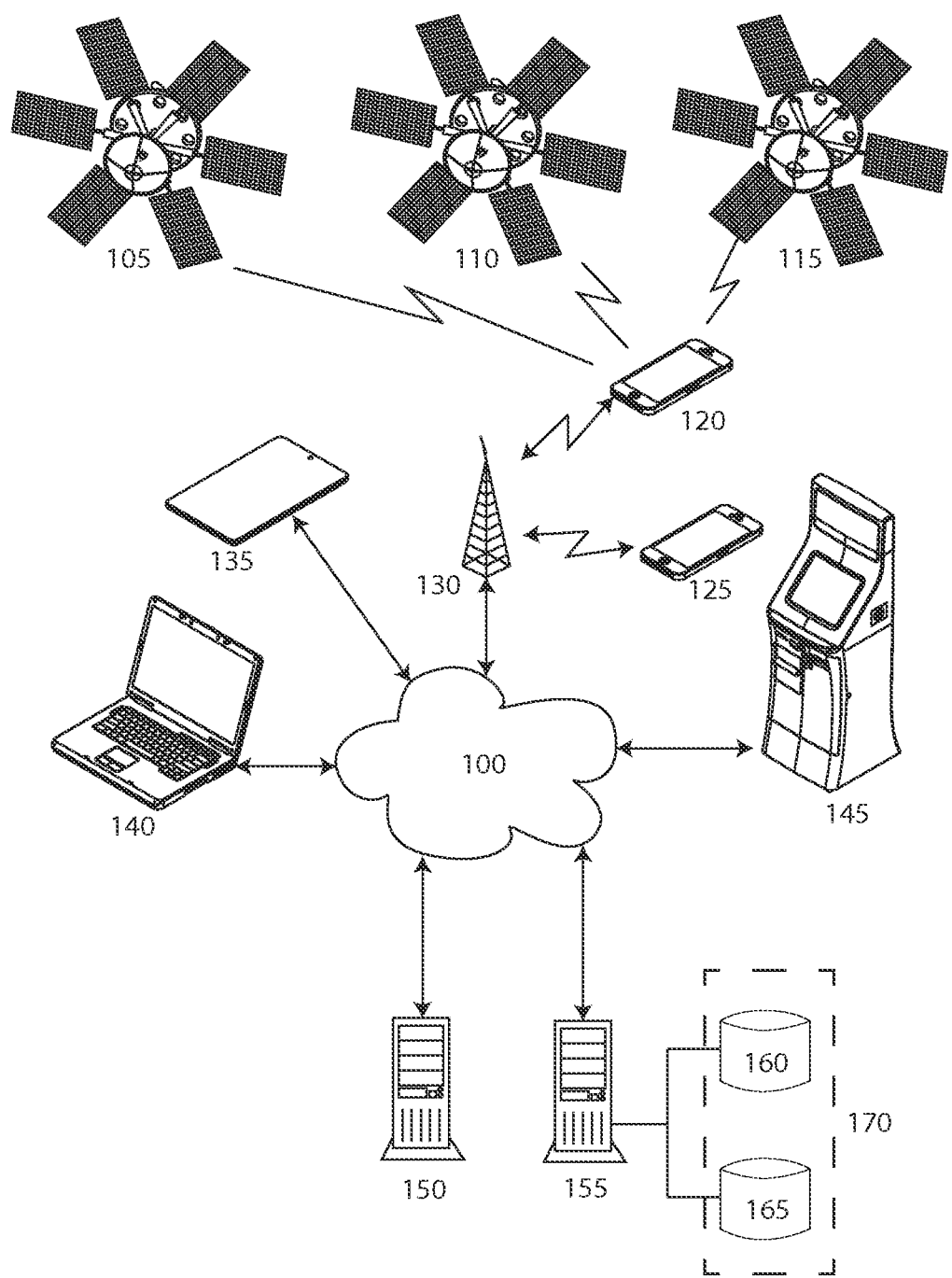
FIG. 1 is a high level block diagram illustrating components of an exemplary system according to principles of the invention.

Referring now to FIG. 1, a high level block diagram of hardware components of a system according to principle of the invention is conceptually illustrated. Consistent with the present invention, users of the system use computing devices, such as a cellular phones 120, 125, a tablet 135, a laptop computer 140, a personal computer or a kiosk 145, or a desktop computer 150, communicating in a wireless or wired mode via the Internet 100. The computing devices (i.e., clients or client devices) are equipped with software for inputting and displaying information in accordance with the methodologies described herein. Such software may comprise a web browser and/or a mobile device app. Some of the computing devices 120, 125 may be equipped with cellular wireless communication modules providing internet access via wireless cellular communication infrastructure 130.

In certain embodiments of a system and methodology according to the principles of the invention, a user's location may be specified. Location may be user input or automatically determined using GPS data, IP trace or triangulation information. Some of the computing devices may be equipped with Global Positioning System ("GPS") receivers for receiving signals from GPS satellites 105-115 to determine location of the device.

Certain clients 120-150 may not have access to a GPS service (for example, they may lack hardware necessary to support such a service); consequently, such GPS information may not be available for all clients 120-150. Also, it is observed that certain GPS services do not operate in certain locations, such as indoors. Thus, even if a client 120-150 does have the necessary hardware and software to support a GPS service, occasionally GPS information from the GPS service may not be available to a particular client 120-150.

IP trace information may include the public IP address of the client 120-150 and the set of IP addresses that data packets sent from the client 120-150 pass through to reach server 150. The public IP address of the client 120-150 may be determined by gathering the source IP address from the server socket receiving the client 120-150 connection. The list of hops through which the data packets sent from the client 120-150 go through may be determined by sending adaptive TTL (time to live) UDP packets to server 150 from the client 120-150. In order to determine if the client 120-150 is being an IP proxy, server 150 may correlate the list of hops with the public IP address of the client 120-150. In this way, server 150 may effectively discover the real public IP address of the client 120-150. The real public IP address of the client 120-150 is then matched against a database of Internet Service Providers (ISPs) which returns the probable address of the originating client 120-150 message. This probable address of the originating client 120-150 message may then be translated to a set of longitude and latitude coordinates.

Triangulation information for a client 120-150 may include a list of public Wi-Fi access points surrounding the client 120-150 as well as the signal strength of each Wi-Fi access point accessible by the client 120-150. The list of surrounding Wi-Fi access points, and their signal strength, may be formatted and correlated with a database of public Wi-Fi access points by server 150 to determine a probable set of longitude and latitude coordinates for the client 120-150. The database of public Wi-Fi access points employed by server 150 may be updated over time to reflect new information about available Wi-Fi access points.

The invention is not dependent upon location information. Certain implementations of the invention may not take location into consideration. In implementations that take location into consideration, certain types of location data may be more accurate or reliable than others. GPS information is more accurate and indicative of the correct physical location of a client 120-150; however, as explained above, GPS information for a particular client 120-150 may not always be available. Triangulation information, while not as accurate and reliable in identifying the correct physical location of a client 120-150 as GPS information, is more accurate and reliable than IP trace information. However, triangulation information also may not always be available, e.g., the client 120-150 may not be able to detect any nearby recognizable Wi-Fi access points. Additionally, while IP trace information is less accurate than either GPS information or triangulation information in determining the correct location of a client 120-150, it is always obtainable if the client 120-150 can communicate to server 150 over the Internet.

Additionally, a consumer may input location (e.g., an address) for a device, such as a personal computer, laptop 140 or tablet 135, that may not be equipped with a GPS receiver. For a device, such as a kiosk 145, at a fixed location, the location of the device may be known and associated with a unique identifier (e.g., MAC address) for the device.

The term "service provider" is used herein to mean any entity that provides a service using a system or methodology according to principles of the invention. The service provider may be, for example, an online service provider with a web-accessible system that receives and processes directives and marketing objects according to principles of the invention. The term "consumer" or "customer" is used herein to mean any individual or entity that requests or seeks marketing objects or goods or services of a business, whether for free or in exchange for compensation. The term "user" or "end user" is used herein to mean any individual or entity that uses the system, whether as a business promoting goods or services or as a consumer interested in procuring goods or services.

Using the computing device 120-150 and client software ("client") such as a browser or app, a user may create a directive. A directive comprises an authoritative instruction pertaining to delivery of an electronically deliverable marketing object. A directive may be a consumer directive or a marketing directive. A consumer directive may be one of many different types, including, but not limited to, a location directive, a personal information directive, a general directive and a specific directive. The system stores data for each directive as one or more records in a database 170. A user may access, change and delete directives using the system.

A location directive identifies the user and provides location information for the user. The location information may comprise an address such as a home, business or temporary address, or another location. A location directive may be time bound, i.e., effective for a user-specified period of time.

A personal information directive may provide some or all of a user's gender, race, age, religion, marital status, income level, education level, profession, and personal interests to facilitate delivery of marketing objects pertaining thereto. Items of data may be optional, to accommodate users with heightened sensitivity to privacy and/or anonymity.

A general directive remains active until canceled. A general directive identifies goods, services, categories of goods and services, brands, or other identifiable classificatory division of subject matter that is of interest or desired by a user. The general directive identifies the user and the subject matter of interest. A graphical user interface may present a user with a form that allows a user to identify a multitude of subject matter of interest. From the form, a general directive may be produced for each subject matter. By way of example and not limitation, one category may be pickup trucks and another category may be Ford F150® pickup trucks.

A specific directive is an immediate request. A specific directive identifies goods, services, categories of goods and services, brands, or other identifiable classificatory division of subject matter that is presently required by a user. The specific directive identifies the user and the subject matter required. A graphical user interface may present a user with a form that allows a user to identify each subject matter required. From the form, a specific directive is produced for each subject matter. Specific directives are processed immediately or as soon as practicable. A specific directive may be time bound, i.e., limited in duration (e.g., for a day, week, month, until an end date, etc. . . . ). By way of example and not limitation, a specific directive may request coupons for a particular business. The specific directive may be limited to a particular day when the coupons are needed. After that day, the coupons will not be provided unless requested again.

The service provider's computing device 155 includes a server (e.g., web server) accessible via a network such as the Internet 100. The server 155 is communicatively coupled to one or more databases 160, 165 and operates a database management system (DBMS) that stores, updates, sorts, queries and analyzes structured data in one or more databases 160, 165, and produces reports and output based on the data. The databases 160, 165 may be resident on or local to the server 155, or remote from the server, hosted by a third party and accessible via the Internet 100. Collectively, the databases are referred to as a database 170.

A marketing directive instructs the system to which users the system should send a corresponding marketing object. A marketing directive may specify users by subject matter of interest or by personal attribute or by location, as set forth in consumer directives (e.g., location, personal, specific or general directives). A marketing directive is associated with a marketing object. The marketing object is an image, file, stream or data that will be forwarded to each user with a consumer directive that matches a marketing directive. The marketing object may be stored in the database 170.

Time bound provisioning is available. All directives may be time bound. In other words, a directive may be active for a limited period of time, defined in hours, days, weeks, months or years. For example, a general directive may be time bound for a year. The user associated with the general directive may receive a reminder of the time limit prior to the expiration, giving the user a chance to re-provision or remove the time limit. As another example, a merchant user may impose a time limit on a marketing directive for a coupon. The marketing directive may expire on a determined date.

Unit provisioning is also available. For example, a merchant may want to limit a marketing directive to a maximum of 100 or 1000 or 100000 users or transactions. In this case, after the unit limit is reached, the marketing directive expires. The unit limit is reached when the number of copies made available to users equals the unit limit or when the number of transactions using the marketing directive (e.g., using a coupon provided with the marketing directive) exceeds a unit (e.g., transactional) limit. For fairness, in one implementation, the limited number of users may be determined randomly, or using a random selection algorithm, from all users with consumer directives to which the marketing directive is responsive. Alternatively, the limited number of users may be selected based on seniority of their consumer directives—first posted, first served. These and other user selection criteria may be employed if a unit limit must be applied. In the case of a transactional unit limit, the limit may be applied on a first come first served basis.

A database management system executable via the server 155 saves each received directive as a record in a database referred to as a directive repository 160, 165. Directives and marketing objects may be stored in the same or separate databases. Consumer directives and marketing directives may be stored in the same or separate databases. Other data, including user account data and online shopping data may also be stored in repositories 160, 165 or one or more other databases.

The database management system, also referred to as an engine, provides processing, including querying and distribution. Querying entails searching for and retrieving information from the database 170. By way of example, a query may be run for each marketing directive to identify matching consumer directives. Then, each marketing object associated with the marketing directive may be provided to or made accessible to the user associated with each matching consumer directive. If a user has several consumer directives that match a marketing directive, only one copy of the marketing object should be sent or made available. A consumer directive matches a marketing directive when the consumer directive identifies the subject matter of the marketing directive. Marketing objects may be provided to users by sending copies, such as by email or SMS messaging, or by providing a link or other form of notification for the user to access or download the marketing object. In this manner, businesses may push advertisements, information, and coupons to consumers.

A marketing object may be provided by a consumer or a business. A marketing object may comprise any of a wide variety of marketing items, such as coupons, announcements, advertisements, promotional codes, job postings, resumes, personal profiles, etc. . . . Thus, as one nonlimiting example, a marketing object may comprise a coupon (as broadly defined above) for a restaurant to be sent to all users in a certain location (e.g., northeast Florida) who have entered a directive for restaurants, or restaurants of the particular type, or that particular brand of restaurant. As another nonlimiting example, a marketing object may comprise an individual's resume, to be made available to all business users in a certain location (e.g., southern California) who have posted a consumer directive seeking employees in the field of endeavor specified in the marketing directive associated with the resume. As yet another example, a marketing object may comprise information about a new product or event to be sent to all users who have expressed interest in the product or event, or in products or events of the kind.

The system includes a portal for registered users to access features of the system. The portal may be accessed via a web page and/or an app (i.e., an application executable on a computing device). Through the portal, a user may create a directive and/or provide a marketing object. The portal may provide user-navigable forms to facilitate directive creation and marketing object submission.

Illustratively, a form may include form controls and fields to be manipulated and completed by a user. Such controls and fields may include check buttons, radio buttons, sliders, list boxes, drop-down lists, spinners, combo boxes, text boxes and upload buttons. The form data is associated with the user account. The form data specifies the subject matter of the directive. The form data for a user is stored in one or more databases 160, 165 of the system. The user may retrieve, edit, deactivate and otherwise modify the user's form data using the portal.

The system may receive location information from users in the form of a location directive. Location information may comprise a home address, a business address, one or more other addresses, or a current location of the user as determined from location data such as GPS data from a user's smart-phone or other electronic device. The system may utilize a location directive to provide, to a consumer-user, local marketing objects responsive to a directive.

Businesses may create, modify, activate and deactivate advertisements and coupons using the portal. The portal allows businesses to manage marketing directives. Business users may track all of their marketing directives and associated advertisements, coupons and other marketing objects using the portal. An existing marketing directive may be modified, activated, deactivated, renewed and reactivated. New marketing directives may be created. The value of a coupon may be changed by a business. A business may temporarily limit a coupon to a day, days, weeks, months or any combination of dates. Usage data for a marketing directive may be monitored. Reports may be produced to summarize marketing directives and associated data. Additionally, using the portal, a business may create a web page, which may include a description of the business, its products, key personnel and contact information.

A specific directive may include current location information for a user. Thus a user may request a location-specific marketing object. Location information may be specified by a user in a directive (e.g., via entering an address, zip code, city or some other geographical identifier), or by selecting a capture location button, or automatically using a GPS receiver (or other means) of the computing device. In the latter case, upon installation of an app or upon first use, a user may authorize automatic location determination from a device's available GPS receiver or by other means (as discussed above).

Where location specific directives are processed, the service provider system 155 may respond with marketing objects for the particular location or in the vicinity. The vicinity may be defined by one or more zip codes, a geographical area defined by a radius, or some other means for determining nearby merchants. The vicinity may be limited by a mode of travel, as inputted by a consumer. By way of example, the vicinity, for walking, may comprise a more limited area than the vicinity for driving. In one preferred embodiment, the service provider system 155 responds with a number of marketing objects for the closest merchants of the type requested. For example, the service provider system 155 may respond with five, seven, ten or some other number of coupons for the closest restaurants of the type requested in a consumer directive.

By setting a vicinity as described above, the distance a user may travel to take advantage of an offer may be set by the user, so that offers too far away will be filtered. Conversely, businesses may want to target local consumers, limiting their marketing directives to users within specified geographic areas. Again, this may be accomplished by setting a vicinity for a marketing directive.

The service provider system 155 archives directives, including the date and time of the directive, a geographic identifier (e.g., zip code) for the directive, and the subject matter requested. Each directive is associated with a user's account. The archived information is useful. Knowing how many requests for a particular type of merchant in a particular geographic area and on what days and at what times, is useful for determining whether and how a local merchant may benefit from participating in a system according to principles of the invention. Such information is also useful to existing and prospective participating merchants and advertisers. Concomitantly, savings realized by consumer-users and other successes may be determined from the archived data.

Marketing objects provided with the system may include a unique code for each copy provided to each user. For example, the code may be a field (e.g., function) that is based upon the user's unique identification. In this manner, it is possible to determine not only how many marketing objects (e.g., coupons) were distributed, but also, how many were actually used and by whom.

In one implementation, upon receiving data in response to a request for merchants of a particular type, the consumer's computing device 120-155 may receive from the server 155 and display data pertaining to merchants of the type requested in the vicinity of the consumer. Such data may include graphical, textual, audio and video information, one or more of the foregoing, individually and in combinations. The data may include a merchant's name and address, contact information for the merchant, location information for the merchant, popularity as determined from cumulative total selections by consumers, consumer rating information such as a numerical rating or icon rating using notations such as a number of stars, spoons, chef's hats or the like, or some other indicator of a degree of consumer satisfaction. Thus, for example, a consumer computing device 120-155 may display a hyperlinked list of local merchants of the requested type in a particular order. The default order of display may be user selectable or fixed. The order of displayed local merchants may be sorted by proximity, consumer ratings, popularity, or some other distinguishing category.

Using one or more applications executed on the computing device 120-155, a consumer may navigate through the list, select a merchant to view additional information about the merchant, initiate an order process and input information and make selections to complete an order. Thus, for example, in the case of a list of local restaurants, a consumer may select a particular restaurant to view a menu for the restaurant. Additional information for a merchant may be provided from the service provider's system via the internet 100 as a merchant is selected. Using the computing device 120-155, a consumer may navigate from the menu, back to the list, where the user can select another restaurant and continues reviewing menus. A menu may include product or service descriptions, product or service images, audio, video, pricing information, hyperlinked consumer reviews, and other information. Menu details may be displayed as selectable pictograms. Thus, menu items may be user selectable using the computing device 120-155 to add to a consumer's online shopping cart for the system. A user selectable button (i.e., user interface element that provides a user a way to trigger an event) for adding an item to a cart may be provided. When a menu item is selected or when a corresponding add to cart or purchase icon is selected, using the computing device 120-155, then the consumer is prompted to enter any necessary additional information, such as quantity or special requests (e.g., hold the pickles). An add to cart button may be associated with a quantity drop down list or combo box for specifying a quantity for an item added to a shopping cart. The menu item, quantity, and additional information may be stored in a shopping cart associated with a consumer's account. One example of such additional information, as indicated above, is special requests such as food preparation requests. Other types of special requests may include deferred delivery or recurrence. For example, a consumer may place an order for processing and pickup at a future date. As another example, a consumer may place a recurring order, e.g., a recurring weekday coffee order.

As another example, a subject matter of interest in a consumer directive may be a particular entertainer such as a specific musician, band or comedian. A marketing directive may identify as the subject matter of the marketing directive such entertainer in a particular location. The marketing object may comprise an announcement of a performance scheduled at that location and information pertaining to ticket sales. The system may send the marketing object to all users in the vicinity of the location who have identified the specific entertainer or genre of entertainment in a consumer directive. Thus, consumers may be notified of live performances, special appearance, book signings, talk show appearances by a particular celebrity, and the like.

As another example, which is a variation of the preceding example, subject matter of interest in a consumer directive may be a particular genre of live entertainment such as live rock, live country, stand-up comedy, a television show, an actor, a book or an author. A marketing directive may identify as the subject matter of the marketing directive a particular entertainer in a particular genre of entertainment performing live in a particular location. The marketing object may comprise an announcement of a performance scheduled at that location and information pertaining to ticket sales. The system may send the marketing object to all users in the vicinity of the location who have identified either the particular entertainer or genre in a consumer directive.

As another example, a consumer directive may identify a particular restaurant or a particular type of restaurant, or all restaurants. A marketing directive may be submitted for a restaurant in the vicinity of the consumer's then-current location, or in the vicinity of an address associated with the consumer. In each case, the marketing object associated with each such marketing directive will be made available to the consumer by the system.

As yet another example, a specific directive may seek all coupons for a particular retailer. Each active marketing directive from the retailer for a coupon may be retrieved in a query run in response to the specific directive. The associated coupons, as marketing objects, may then be made accessible to the consumer.

As still another example, a specific directive may seek all coupons for a particular manufacturer. Each active marketing directive from the manufacturer for a coupon may be retrieved in a query run in response to the specific directive. The associated coupons, as marketing objects, may then be made accessible to the consumer. Alternatively, a directive may seek marketing objects representing savings (e.g., coupons, sales or discounts) of a certain level for a particular product or range of products.

As another example, a specific directive may seek a coupon for a particular product. Each active marketing directive for a coupon for the product may be retrieved in a query run in response to the specific directive. The associated coupons, as marketing objects, may then be made accessible to the consumer. The product may be identified by a UPC code, brand and model, or by a barcode (e.g., a barcode imaged by a user using a mobile device).

A unique identifier is associated with each user. The identifier may be assigned at the time the user registers. Similar to a consumer loyalty card account number, the identifier may be utilized at compatibly equipped points of sale, whether brick and mortar or online, to apply coupons. To be compatibly equipped, the point of sale must be configured to transmit data to and receive data from a system according to principles of the invention. A user may be required to enter a PIN or password at checkout to authorize the transaction. The identifier may be stored on a magnetic stripe, as a scannable/readable barcode, electronically in a smart card, or on the display screen of a mobile computing device, or in a wirelessly communicated signal, or in a data packet communicated via network communication. The identifier not only identifies the user, but also identifies the system. Therefore, the point of sale system may poll the system of the invention for applicable coupons for the user.

In one embodiment, a Web crawler systematically browses the World Wide Web for the purpose of populating the databases 160, 165 with system-generated marketing directives. Starting with a list of seed URLs, the Web crawler visits the URLs, identifies all the hyperlinks in the page and adds them to the list of URLs to visit. Such URLs are recursively visited according to a set of policies. The crawler copies and saves website information as it goes. Copied information may include photos, product descriptions, pricing information, and URLs for each product on-sale on a website visited by the crawler. This information may be used to create a system-generated marketing directive and can be completely synchronized to match the consumer directives. (e.g., reduced pricing to specific marketing objects) The system may employ a metric of importance for prioritizing Web pages, by evaluating intrinsic quality and popularity in terms of links or visits. The importance of a page for the crawler can also be expressed as a function of the similarity of a page to a given query.

The system-generated marketing directive is associated with the product description and photo as a marketing object. The marketing object will be forwarded to each user with a consumer directive that matches a marketing directive. The marketing object may be stored in the database 170.

As repositories for product information, the databases 160, 162 may supply data to one or more online storefronts. The system may provide one or more store fronts for online shopping. The storefront is a Web store that is accessed by users to shop. Products offered for sale may be presented from the databases. Users may shop for goods and services via the storefront. Merchants may include their products in the store using a storefront administration system or by listing the products through marketing directives. A purchase icon may be displayed with items identified in marketing directives and on product pages of the storefront. Category, product, and other pages (e.g., search, bestsellers, etc.) may be dynamically generated by the storefront based on the information saved in the store database. By selecting a purchase icon, a shopping cart system is triggered. The shopping cart system is e-commerce software on a web server that allows users to select and accumulate a list of items for purchase. Upon checkout, the system calculates a total for the order, including shipping and handling (i.e., postage and packing) charges and taxes, as applicable. The shopping cart system provides a means of capturing a client's payment information. In the case of payment by credit card, the system relies on a secure gateway provider, in conjunction with the secure payment gateway, in order to conduct secure credit card transactions online. A store administration system may be accessed by the merchant to manage the online shop. Using the administration system, a store manager may add and edit products, categories, discounts, shipping and payment settings, etc.

Figure 2:
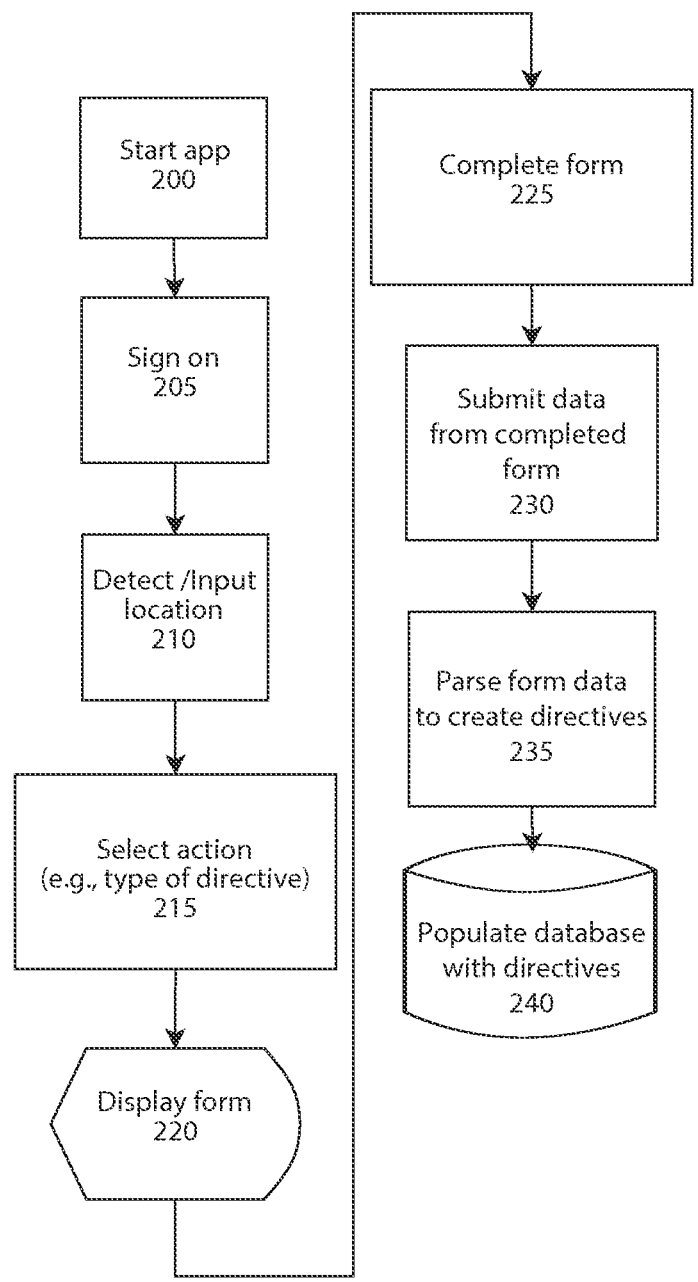
FIG. 2 is a high level flowchart illustrating steps of an exemplary directive methodology for an exemplary system according to principles of the invention.

Referring now to FIG. 2, a high level flowchart conceptually illustrates steps of an exemplary directive methodology for an exemplary system according to principles of the invention. The methodology may be performed using an application, according to step 200. After signing in, as in step 205, the location of the user may be determined using any of the location determination techniques discussed above, as in step 210. The user then selects the action to be performed, from a plurality of available actions, as in step 215. Among the available actions is creating a new request. The action may be identified in lay terms as "Request Coupon" or "Request Marketing Info" or the like. Upon selecting the action the user is presented a form to complete, as in step 220. The form may include controls and fields to gather information for the directive. The directive is associated with the user's account and the time and date. After the user completes the form, as in step 225, it is submitted to the database management system 170, where it is stored as one or more records in a database 160, 165, as in step 230. The system parses the form data, as in step 235, to create records (e.g., directives) to populate the databases 160, 165, as in step 240.

Figure 3:
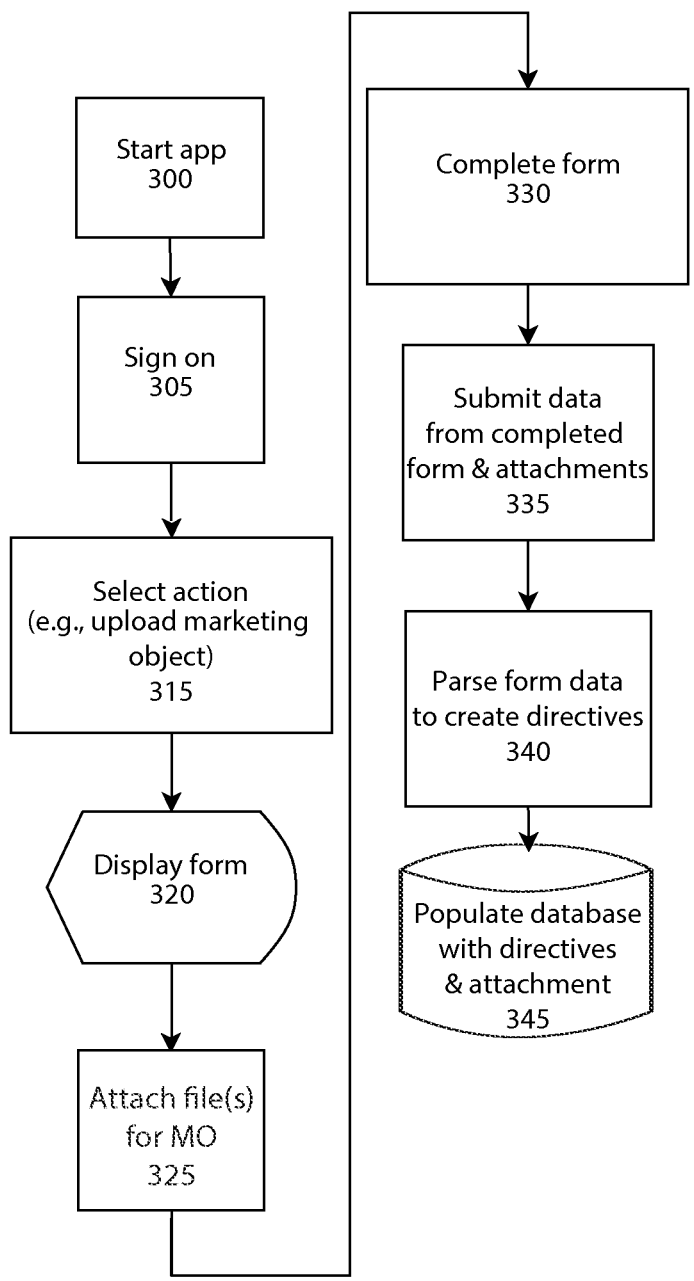
FIG. 3 is a high level flowchart illustrating steps of an exemplary marketing directive methodology for an exemplary system according to principles of the invention.

FIG. 3 provides a high level flowchart illustrating steps of an exemplary marketing directive methodology for an exemplary system according to principles of the invention. The methodology may be performed using an application, according to step 300. After signing in, as in step 305, a business-user selects the action to be performed, from a plurality of available actions, as in step 315. Among the available actions is creating a new marketing directive. Upon selecting the action the user is presented a form to complete, as in step 320. The form may include controls and fields to gather information for the directive. The directive is associated with the user's account and the time and date. One or more marketing objects, such as a coupon, is associated with the directive and uploaded, as in step 325. After the user completes the form as in step 330 and attaches the object as in step 325, the data and object are submitted to the database management system 170, as in steps 335. The system parses the form data, as in step 340, to create records (e.g., directives) to populate the databases 160, 165, as in step 345.

Figure 4:
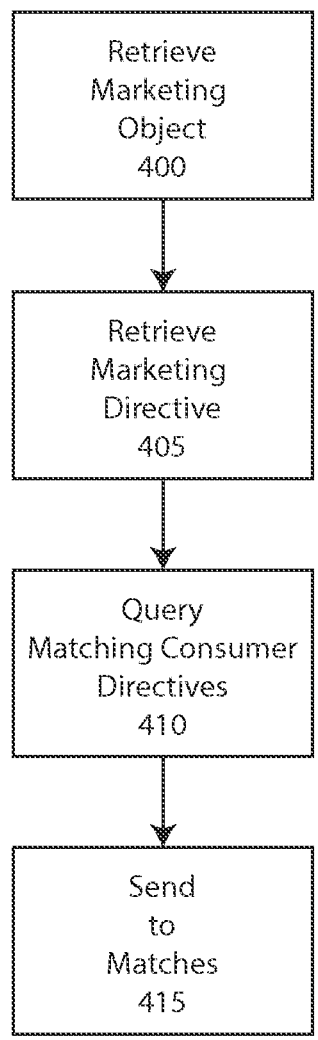
FIG. 4 is a high level flowchart illustrating steps of an exemplary matching methodology for an exemplary system according to principles of the invention.

FIG. 4 provides a high level flowchart illustrating steps of an exemplary matching methodology for an exemplary system according to principles of the invention. The system 155 retrieves a marketing object and marketing directive in steps 400 and 405. Then, in step 410, in accordance with the specifications of the marketing directive, the system queries the database(s) 160, 165 to determine which consumer directives match the marketing directive. The marketing object is sent to users associated with matching consumer directives in step 415.

Figure 5:
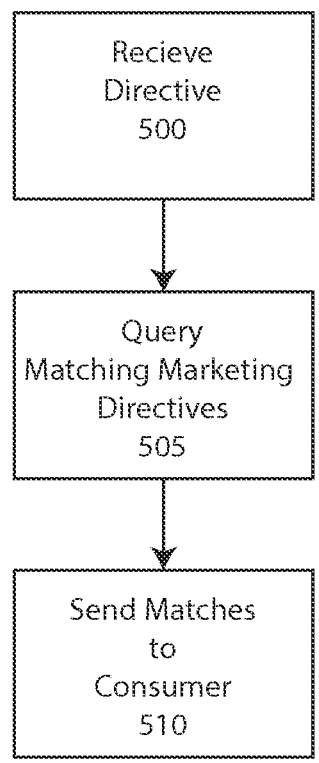
FIG. 5 is a high level flowchart illustrating steps of an exemplary specific directive processing methodology for an exemplary system according to principles of the invention.
Figure 6:
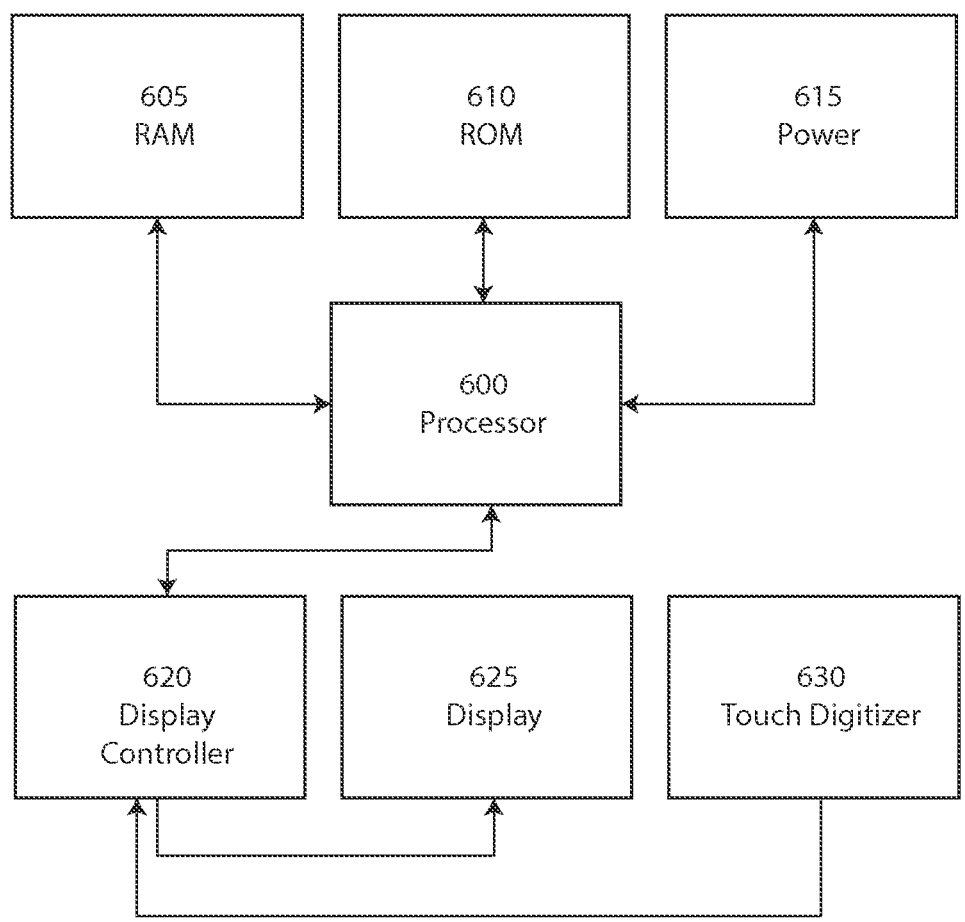
FIG. 6 is a high level block diagram of components of an exemplary mobile device with a touch sensitive screen for use with an exemplary system according to principles of the invention.

FIG. 5 is a high level flowchart illustrating steps of an exemplary specific directive processing methodology for an exemplary system according to principles of the invention. Upon receiving a specific directive (e.g., a consumer-user's request for a coupon or some other marketing object), as in step 500, the system queries the database in accordance with the specific directive, searching for matching marketing directives and associated marketing objects in the database(s), as in step 505. Matching marketing objects are sent to the user, as in step 510. Thus, a user may submit a directive that requests a coupon for a particular product or service. In response, the system will locate marketing objects responsive to the submission.

In one embodiment, a system according to principles of the invention disseminates marketing objects of marketing directives that are responsive to consumer directives upon receipt of the marketing directive. The marketing directive may be input by a vendor or obtained by an automated process, such as web crawling. Upon receipt of a marketing directive, the system determines the consumer directives, if any, to which it is responsive, and disseminates the marketing objects associated with the marketing directives in an appropriate manner, as soon as possible. In this manner, a consumer may receive timely notifications of time-sensitive sales, events, news and other matters.

Mobile device 120 is a computing device as described above in reference to FIG. 1. The device 120 may include one or more processing units (CPU's) 600, memory such as RAM 605 and ROM 610, and a power supply 615. Additionally, the device 120 may include a display controller 620, a display 625 and a touch digitizer 630. These may comprise merely a few of the components of the mobile device 120. Various components may be implemented in hardware, software, or a combination of both hardware and software, including one or more signal processing and/or application specific integrated circuits.

The touch digitizer 630 comprises a touchscreen, an electronic visual display that the user can control through simple or multi-touch gestures by touching the screen with a special stylus/pen and-or one or more fingers. The touchscreen enables the user to interact directly with what is displayed, rather than using a mouse, touchpad, or any other intermediate device (other than a stylus, which is optional for most modern touchscreens). The touch digitizer 630 further comprises a transparent overlay covering the visual display. The overlay senses the touch of one or more fingers or a stylus. In response to a touch, the overlay produces a change in electrical properties (e.g., a change in current, voltage, capacitance or resistance). The touch digitizer interprets the commands that the changed electrical properties represent and communicates the commands to the appropriate applications. The touch digitizer 630 further comprises a display controller that receives and/or sends electrical signals from and to the visual display and overlay. Visual output may include graphics, text, icons, video, and any combination thereof (collectively termed "graphics"). In some embodiments, some or all of the visual output may correspond to user-interface objects. The display controller (along with any associated modules and/or sets of instructions in memory) detect contact (and any movement or breaking of the contact) on the overlay and converts the detected contact into interaction with user-interface objects (e.g., one or more soft keys, icons, web pages or images) that are displayed on touch-sensitive display. In an exemplary embodiment, a point of contact between touch digitizer 630 and the user corresponds to a finger of the user. The visual display may comprise LCD (liquid crystal display) technology, LPD (light emitting polymer display) technology, or LED (light emitting diode) technology, although other display technologies may be used in other embodiments. The overlay and display controller of the touch digitizer 630 may detect contact and any movement or breaking thereof, including speed (magnitude), velocity (magnitude and direction), and/or an acceleration (a change in magnitude and/or direction) of the point of contact, using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display. These operations may be applied to single contacts (e.g., one finger contacts) or to multiple simultaneous contacts (e.g., "multitouch"/multiple finger contacts).

Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Figure 7:
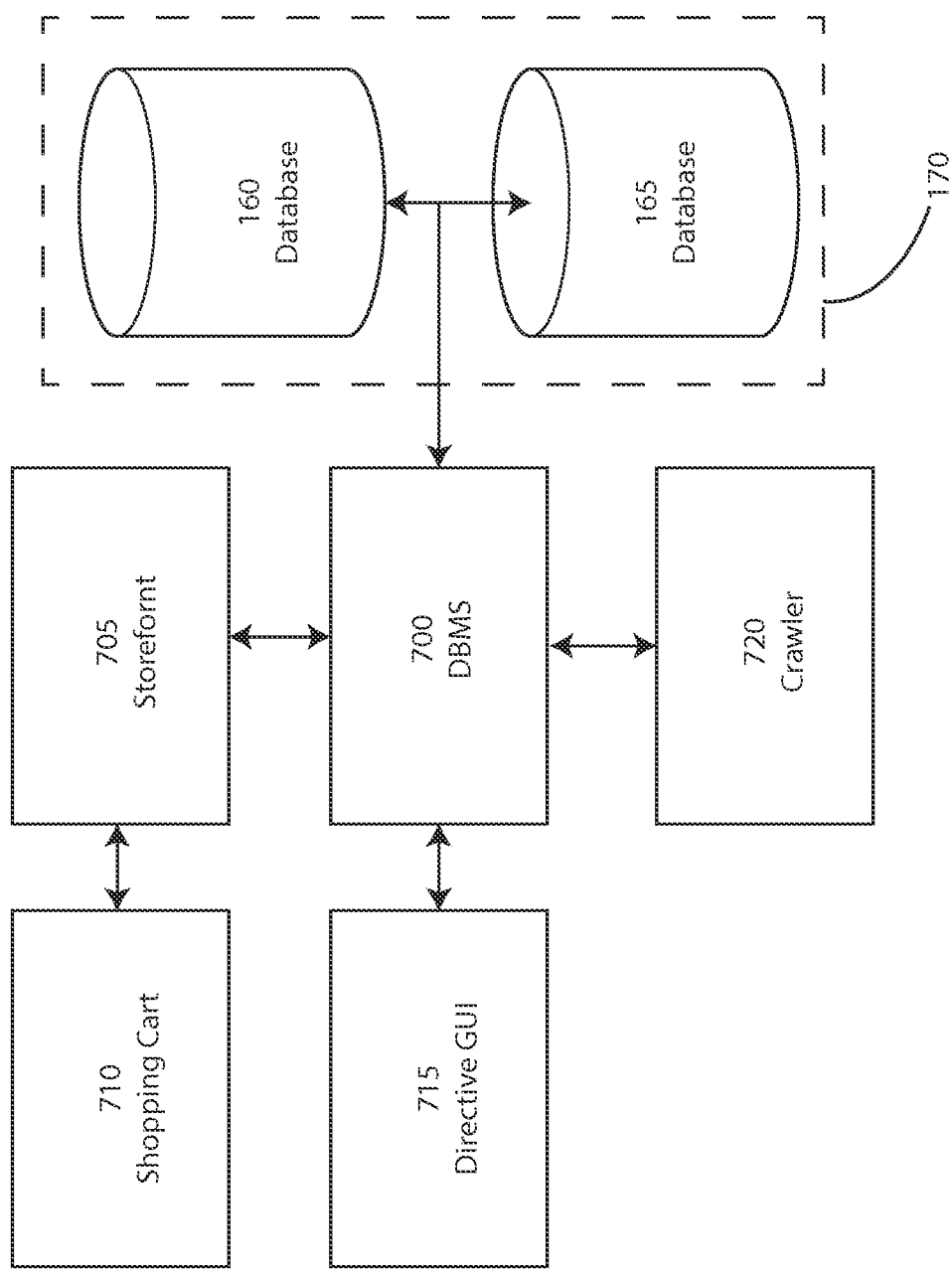
FIG. 7 is a high level block diagram of software modules of an exemplary system according to principles of the invention.

Referring now to FIG. 7, various modules of an exemplary system according to principles of the invention are conceptually illustrated. Modules may be implemented in hardware and/or in software (including firmware, resident software, micro-code, etc.). The database management system 700 (DBMS) stores, updates, sorts, queries and analyzes structured data in one or more databases 160, 165, and produces reports and output based on the data. Collectively, the databases are referred to as a database 170 or a repository or the like.

As repositories for product information, the database 170 may supply data to one or more online storefronts. The system may provide one or more storefronts 705 for online shopping. The storefront 705 is a Web store that is accessed by users to shop. Products offered for sale may be presented from the database 170. Users may shop for goods and services via the storefront 705. Merchants may include their products in the store using a storefront administration system or by listing the products through marketing directives. A purchase icon may be displayed with items identified in marketing directives and on product pages of the storefront. Category, product, and other pages (e.g., search, bestsellers, etc.) may be dynamically generated by the storefront based on the information saved in the database 170. By selecting a purchase icon, a shopping cart system 710 is triggered. The shopping cart system 710 is e-commerce software on a web server that allows users to select and accumulate a list of items for purchase. Upon checkout, the system 710 calculates a total for the order, including shipping and handling (i.e., postage and packing) charges and taxes, as applicable. The shopping cart system 710 provides a means of capturing a client's payment information. In the case of payment by credit card, the system 710 relies on a secure gateway provider, in conjunction with the secure payment gateway, in order to conduct secure credit card transactions online. A store administration system may be accessed by the merchant to manage the online shop. Using the administration system, a store manager may add and edit products, categories, discounts, shipping and payment settings, etc.

Using the computing device 120-150 and client software such as a browser or app, a user may create a directive. A Directive GUI 715 is the user interface for users to create and manage directives. The interface includes controls and fields for directive creation and management. Management may entail activating, deactivating, reactivating, modifying and canceling a directive. As discussed above, each directive comprises an authoritative instruction pertaining to delivery of an electronically deliverable marketing object. The directive may be a consumer directive or a marketing directive.

A consumer directive may be one of many different types, including, but not limited to, a location directive, a personal information directive, a general directive and a specific directive. The system stores data for each directive as one or more records in the database 170. Using the Directive GUI, a user may access, change and delete directives using the system. The GUI 715 allows a user to identify and select existing directives of that user and create new directives. A selected existing directive may be managed using the GUI 715. All existing directives may be displayed in a table, showing their title, creation date, effective dates, and other information related to the directives, to facilitate tracking and management.

A web crawler 720 systematically browses the World Wide Web for the purpose of populating the database 170 with system-generated marketing directives. Starting with a list of seed URLs, the Web crawler visits the URLs, identifies all the hyperlinks in the page and adds them to the list of URLs to visit. Such URLs are recursively visited according to a set of policies. The crawler copies and saves website information as it goes. Copied information may include photos, product descriptions, pricing information, and URLs for each product on-sale on a website visited by the crawler. This information may be used to create a system-generated marketing directive. The system may employ a metric of importance for prioritizing Web pages, by evaluating intrinsic quality and popularity in terms of links or visits. The importance of a page for the crawler can also be expressed as a function of the similarity of a page to a given query.

Figure 8:
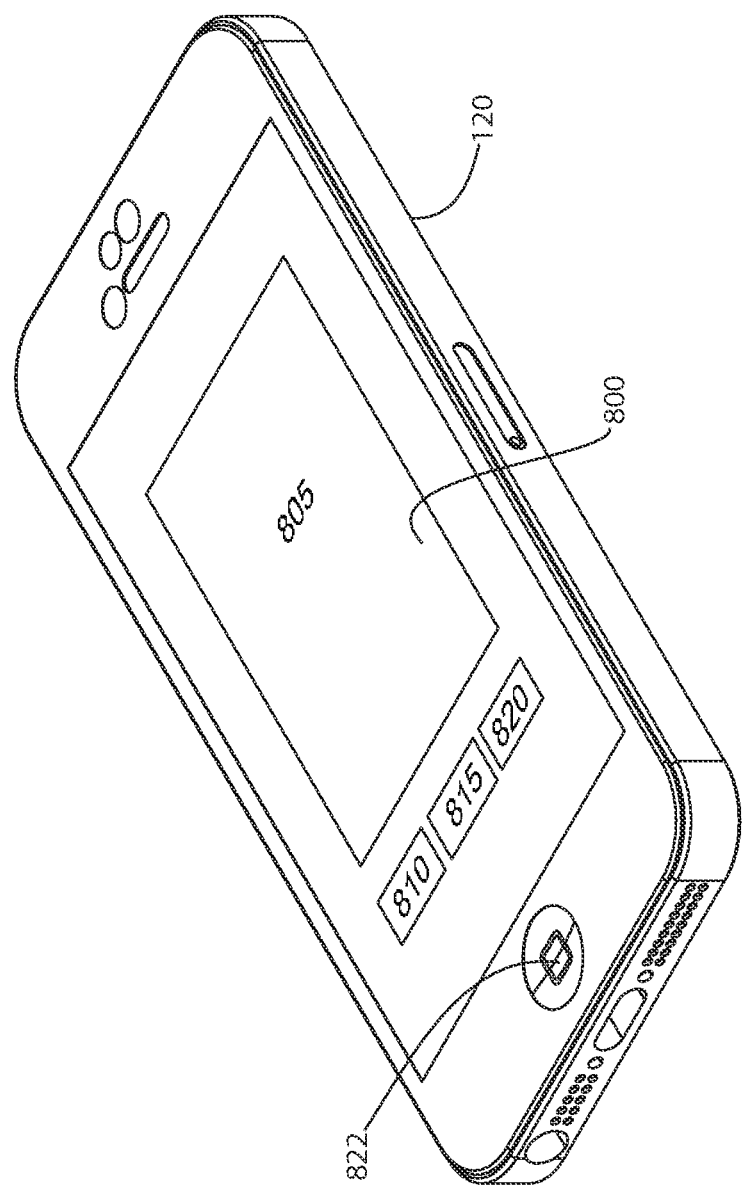
FIG. 8 is a perspective view of an exemplary mobile device with a touch sensitive screen for use with an exemplary system according to principles of the invention.

Referring now to FIG. 8, an exemplary mobile device 120 with a touch sensitive screen for use with an exemplary system according to principles of the invention is shown. The exemplary screen 800 displays a marketing object 805 and controls 810-820. The marketing object may be a coupon, discount code, product listing, product pictogram, or some other visual object. While three controls are shown, additional controls may be provided and located and arranged differently than as shown. The controls 810-820 trigger actions relative to the marketing directives and marketing object 805. The marketing object 805 may be removed from the screen 800 by swiping motion. In such case, the next or previous marketing object 805 in a series of marketing objects may be displayed on the screen 800. If there are no other marketing objects to display, a default display may be presented.

The displayed controls 810-820 may be dynamic, changing their content and functionality to work with the displayed marketing object 805. In one embodiment, the controls 810-820 may include a purchase button which allows a user to purchase a displayed product. In another embodiment, the controls 810-820 may include an apply now button, allowing a user to use a coupon to make a purchase. In one embodiment, the controls 810-820 may include consumer directives which allow a user to activate specific directives and marketing objects of the user's choice to be displayed as products or services. (e.g. reduced price point, color, size, shorts) In yet another embodiment, the controls 810-820 may include a bookmark button, allowing a user to archive the marketing object 805 in a list of favorites. Other possible controls 810-820 include a share button, allowing a user to send the marketing object or a link thereto to a friend; a block button, allowing a user to block such marketing object in the future; and a button to bring up more available actions. These non-limiting examples illustrate the range of possible controls.

The app may be voice controlled. In one embodiment, control selections and other actions may be performed using voice commands, using a microphone 822 and audio processing hardware and software of the mobile device 120.

Figure 9:
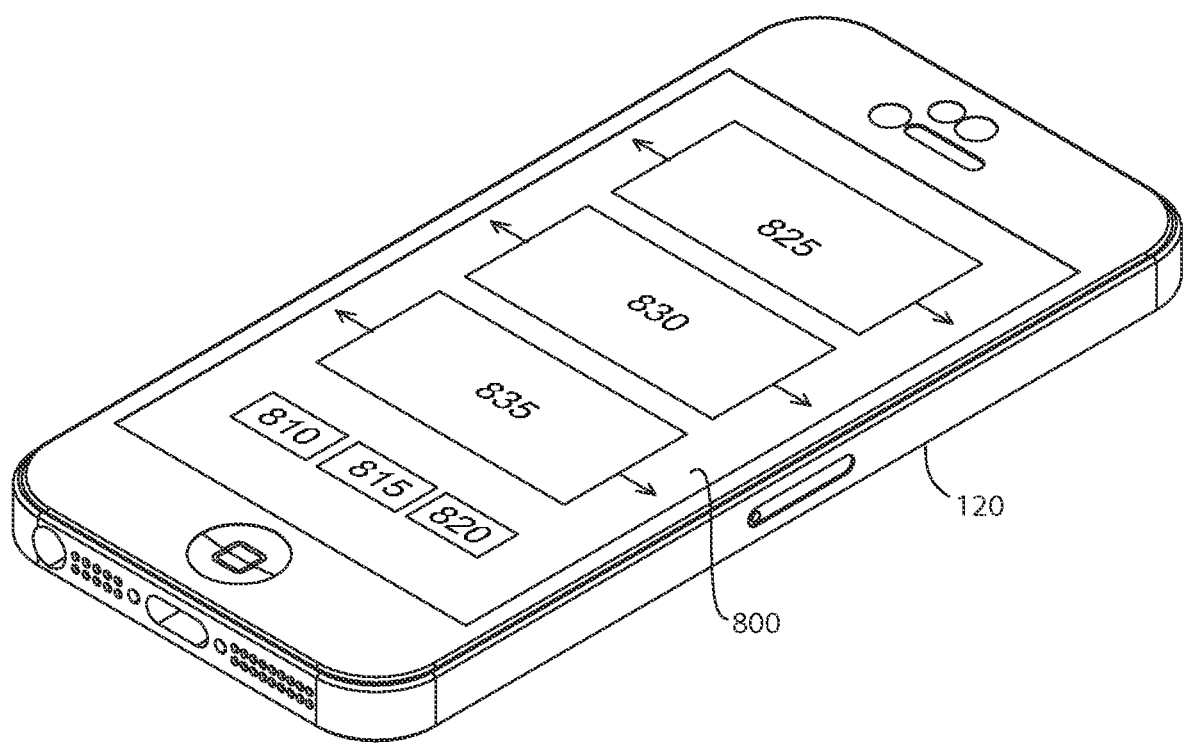
FIG. 9 is a perspective view of an exemplary mobile device with a touch sensitive screen for use with an exemplary system according to principles of the invention.

FIG. 9 is another perspective view of the exemplary mobile device 120 with a touch sensitive screen for use with an exemplary system according to principles of the invention. In this embodiment, the display is divided into a plurality (e.g., three) separate marketing object sections 825, 830, 835. Each section is a level (e.g., level 1 -825, level 2 -830, level 3 -835).

A user may assign marketing objects to be displayed in a level. Thus, for example, a user browsing the storefront for a new outfit to wear may assign shirts to level 1, pants to level 2, and shoes to level 3. The user may assign a plurality of shirts to level 1, a plurality of pants to level 2 and a plurality of shoes to level 3. The user may manipulate the items displayed on each level by swiping motion. A swipe brings up the next or preceding object assigned to that level. In this manner a user may examine several related objects simultaneously and make a purchasing decision or select new consumer directives to activate new selected marketing directives of the same marketing object to notify the user of a preferred price point or preferred content. The user may scroll by swiping through many objects in each level. While three levels are shown, two or more levels may be specified and used within the scope of the invention.

Figure 10:
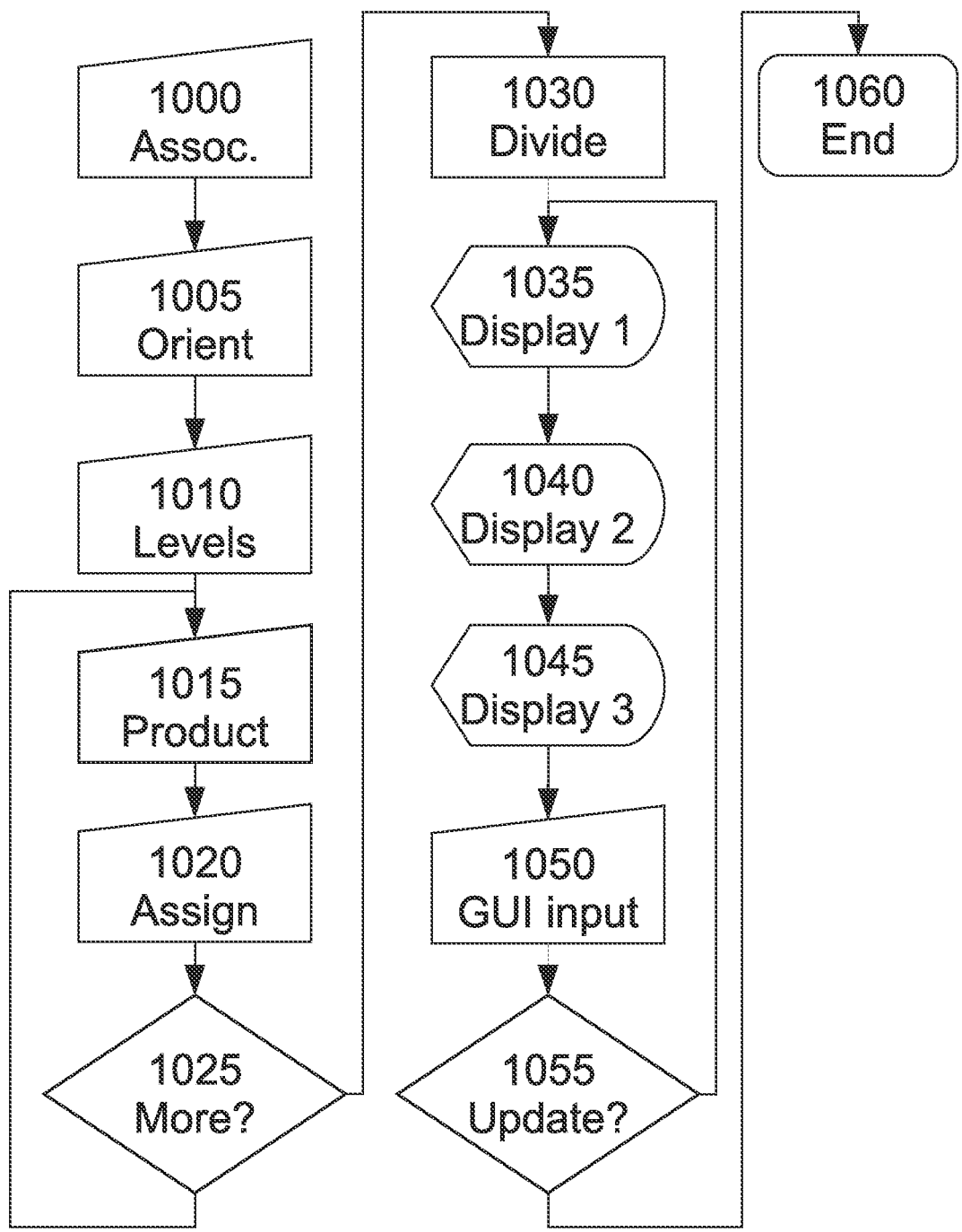
FIG. 10 is a high level flowchart of an exemplary method of simultaneously displaying and arranging a plurality of photos or pictograms to facilitate browsing and purchasing decisions using an exemplary system according to principles of the invention.
Figure 11:
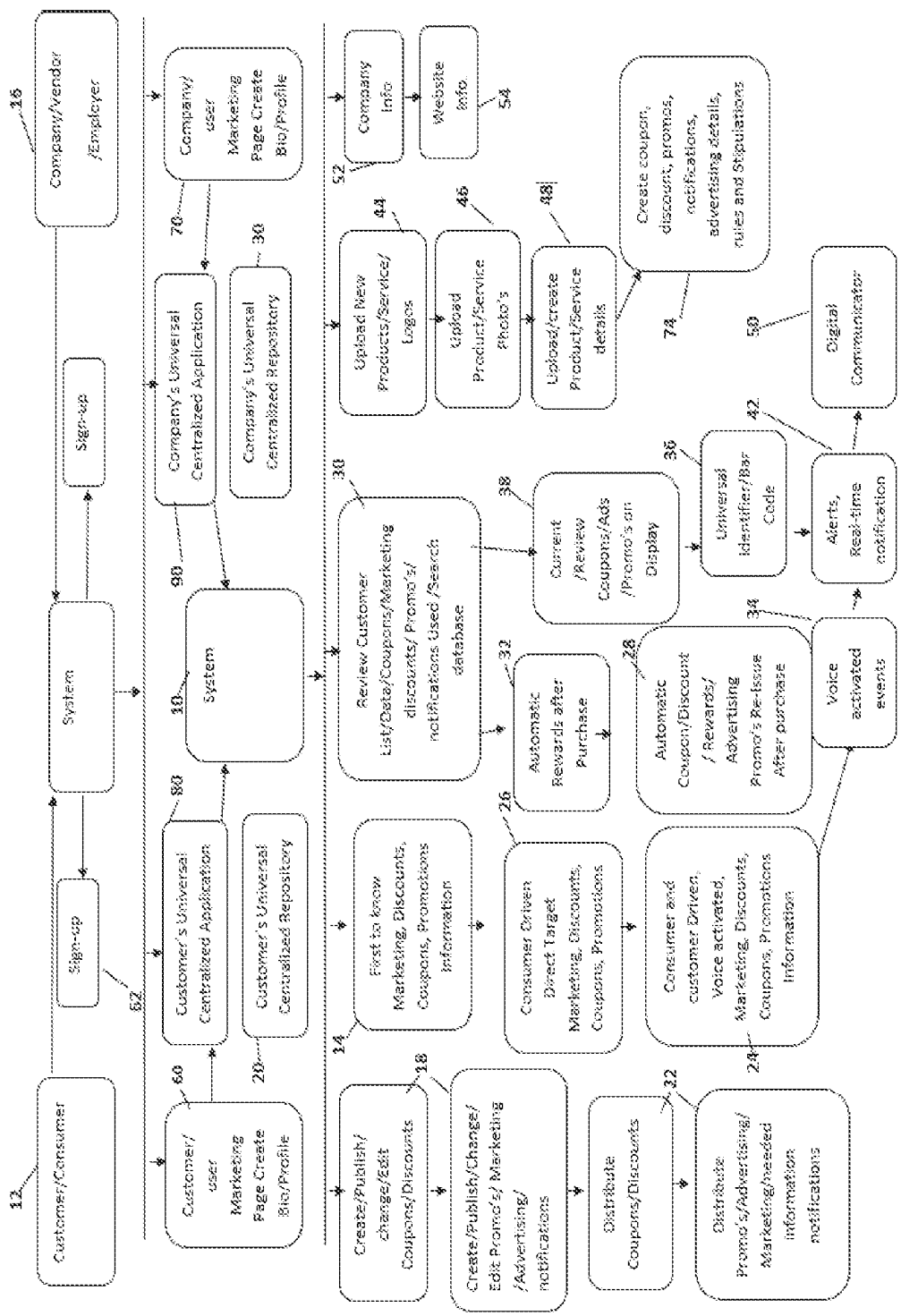
FIG. 11 is a schematic overview of functions and embodiments in accordance to the system.
Figure 12:
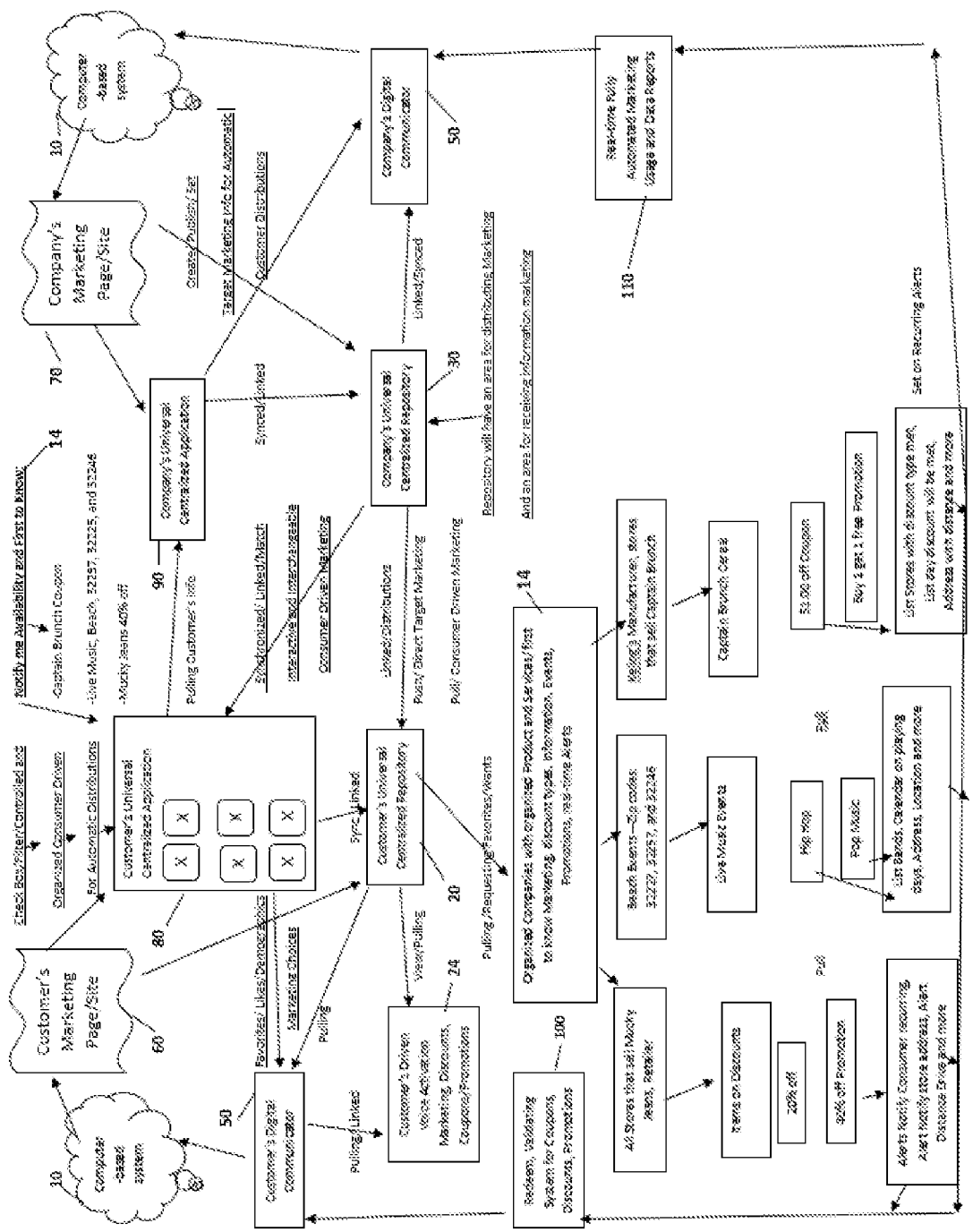
FIG. 12 is a schematic overview and illustration of an exemplary computer-based method and system of an interactive and interchangeable universal centralized application and repository of customer driven marketing, first to know marketing, and direct target marketing in accordance to the embodiments of the present invention.
Figure 13:
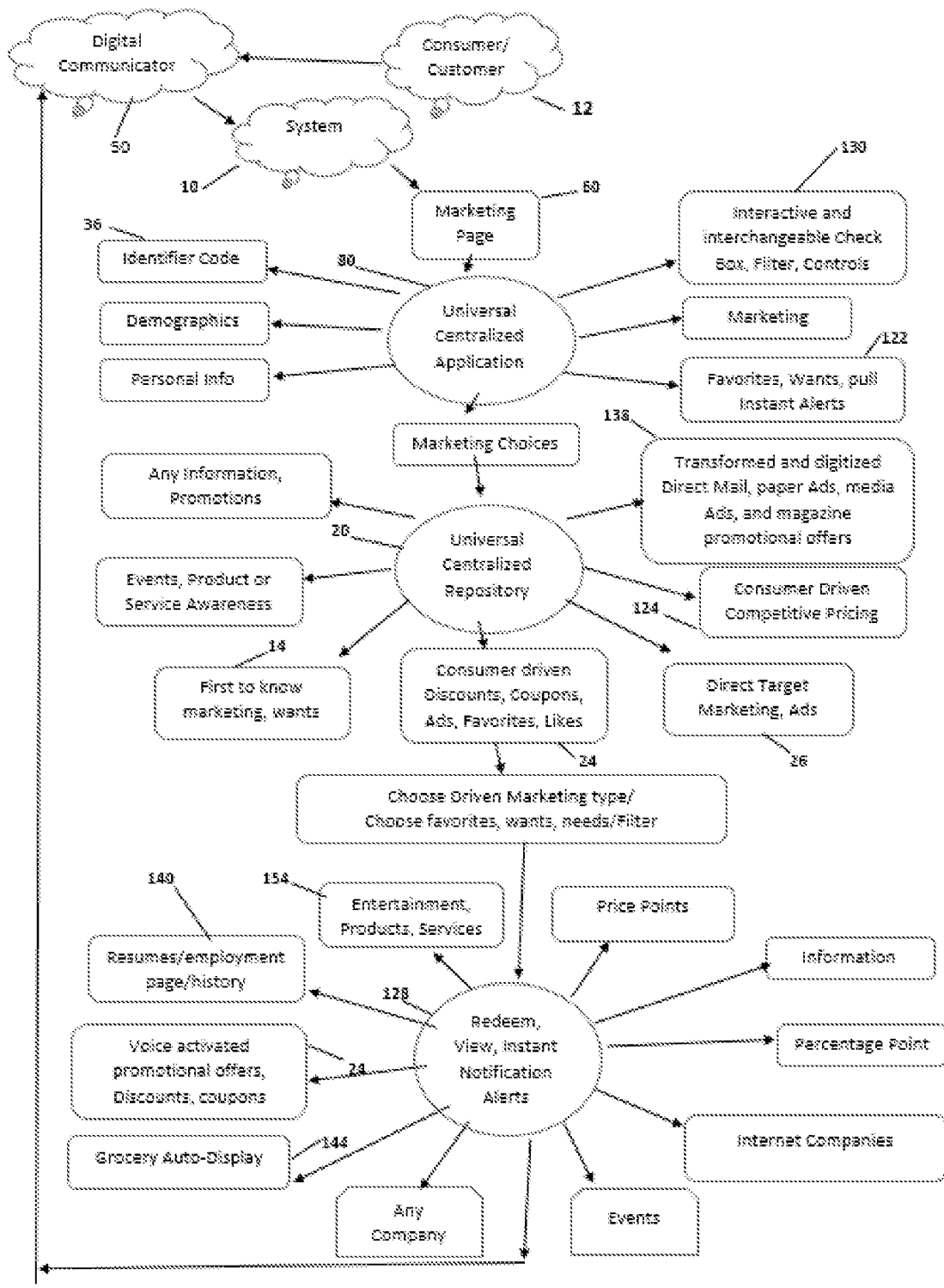
FIG. 13 is a schematic overview and illustration of an exemplary of consumer or customer functions or choices in accordance to the customer's digital communicator, discounts, coupons, rewards, promotions, advertising, marketing, information, products, services, universal centralized application and repository.
Figure 14:
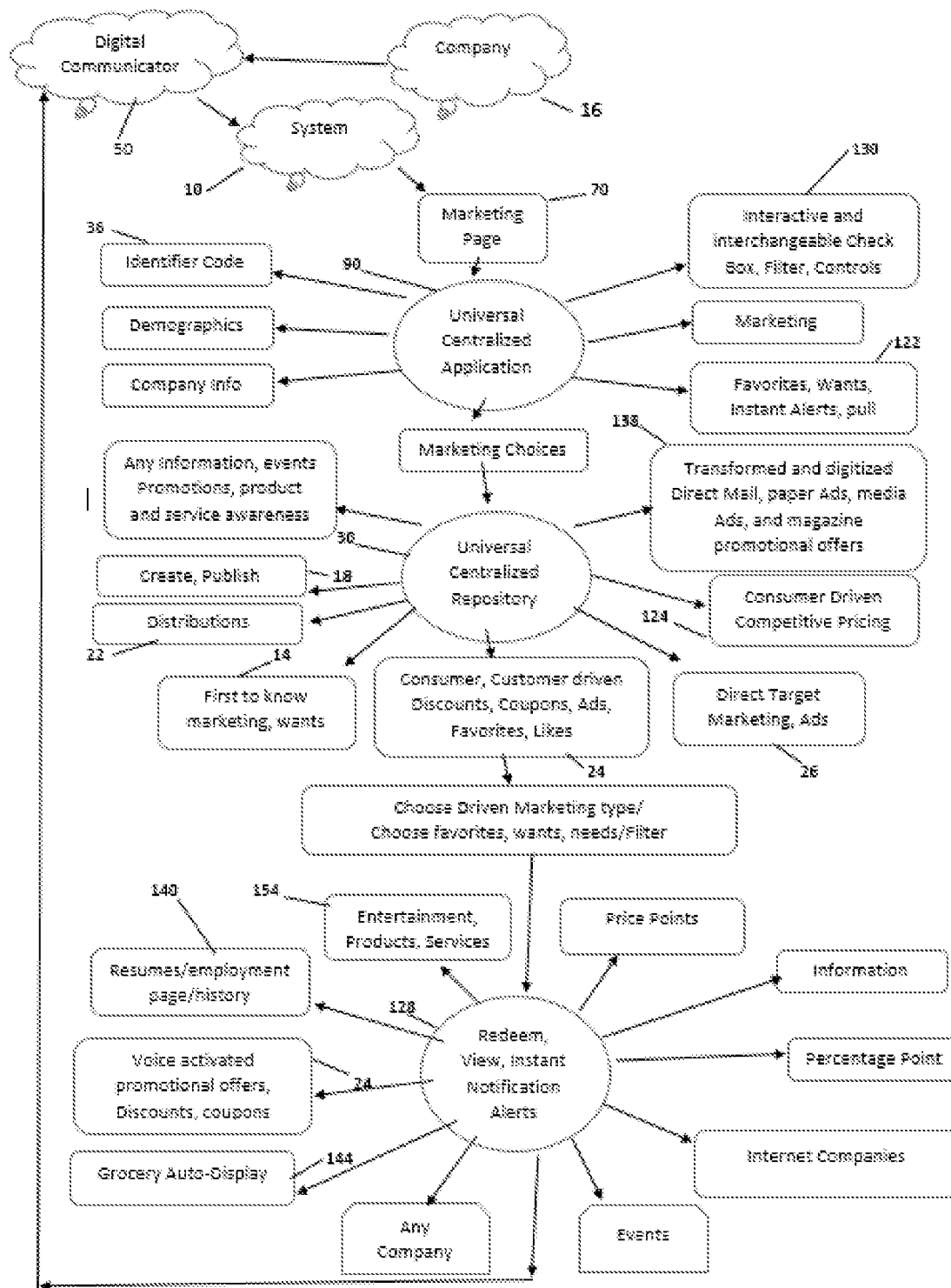
FIG. 14 is a schematic overview and illustration of an exemplary of company functions or choices in accordance to the company's digital communicator, discounts, coupons, rewards, promotions, advertising, marketing, information, products, services, universal centralized application and repository.
Figure 15:
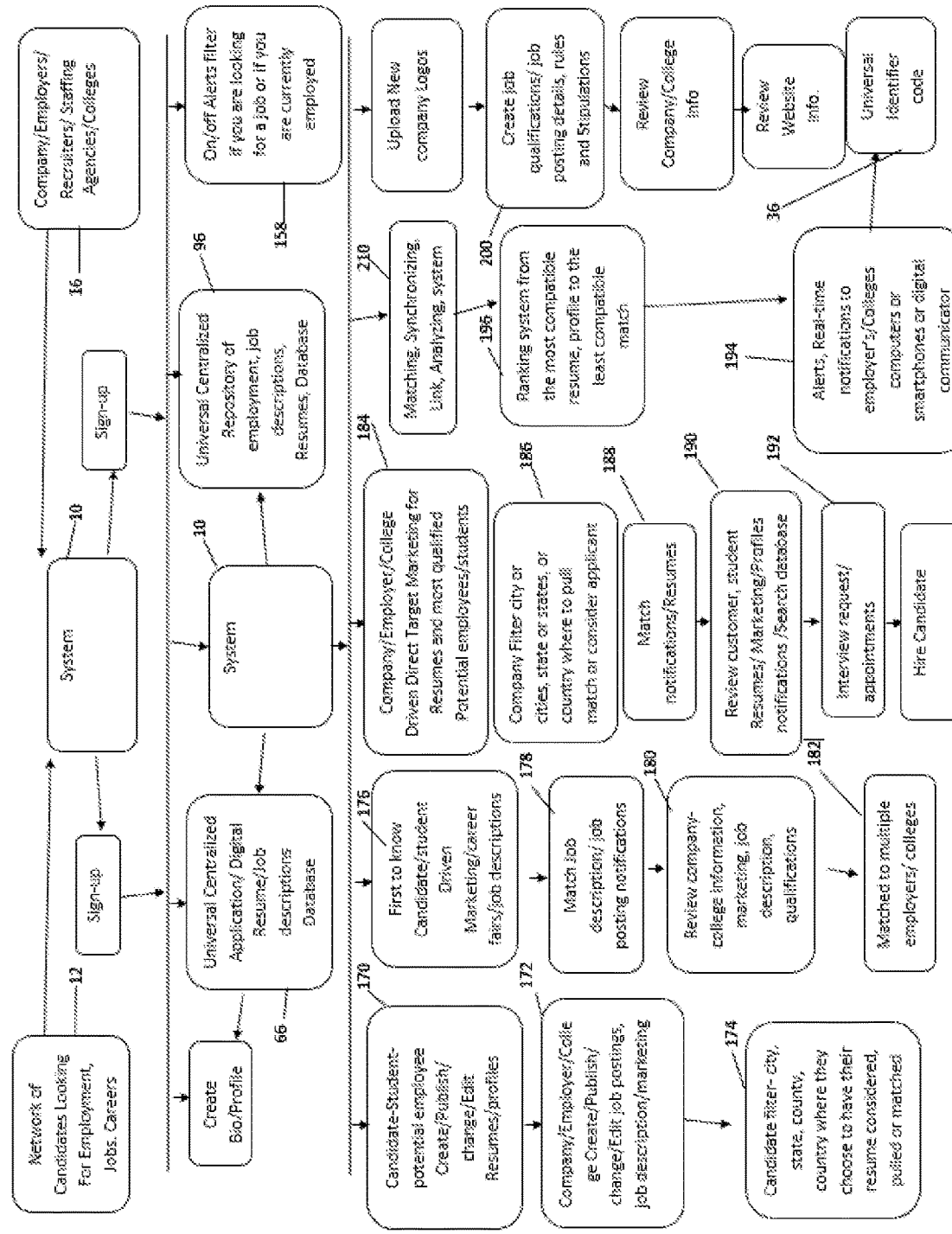
FIG. 15 illustrates a schematic overview of the universal method and system on a digital resume and job description system on how it relates to a one stop shop for all job descriptions to search and pull matching resumes.
Figure 16:
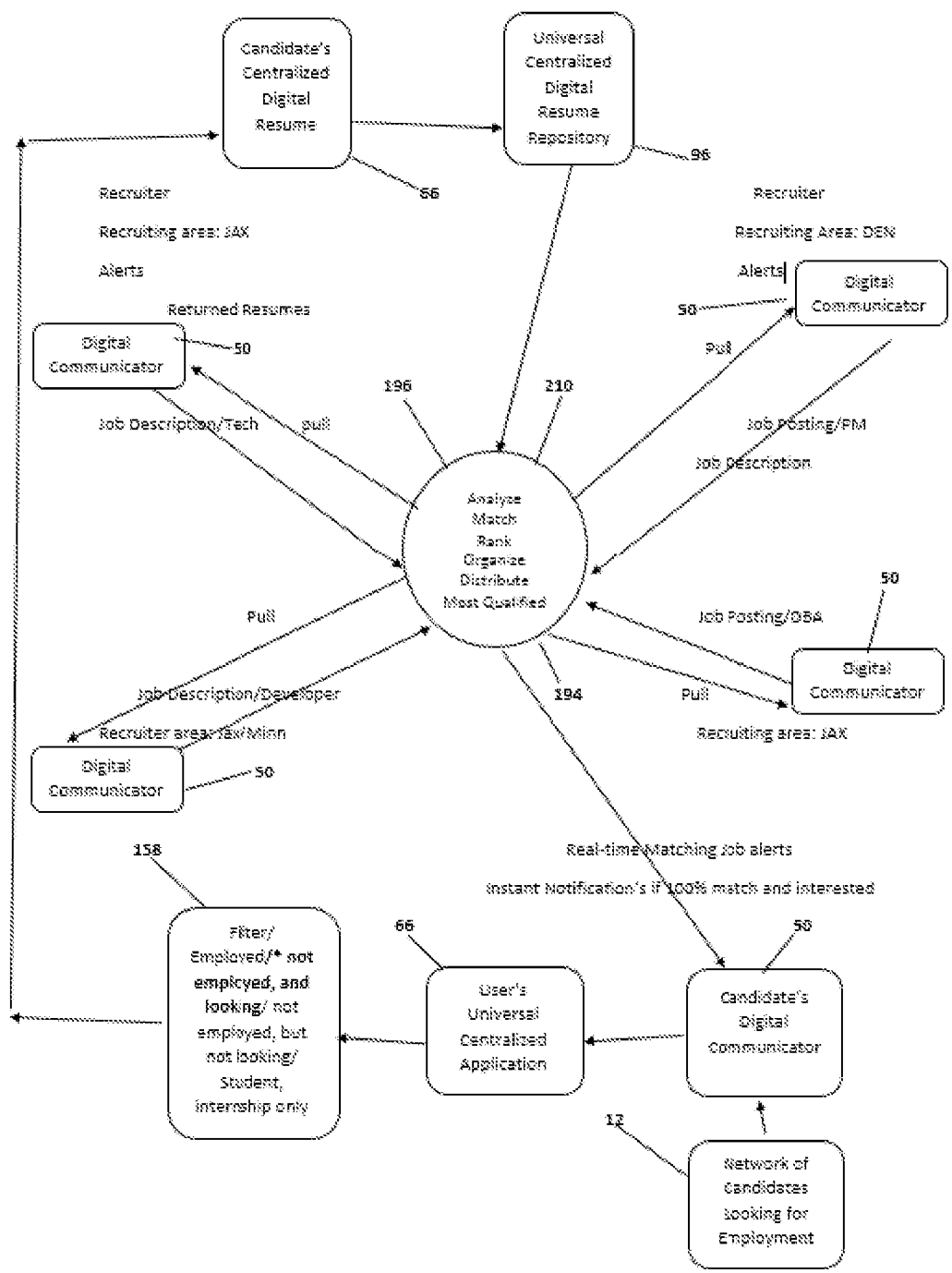
FIG. 16 illustrates an exemplary of a network of digital resumes and candidates, digital job descriptions and recruiters, and how they are linked and synchronized, for matching resumes and job descriptions.

FIG. 10 is a high level flowchart of an exemplary method of simultaneously displaying and arranging a plurality of photos or pictograms to facilitate browsing and purchasing decisions using an exemplary system according to principles of the invention. In step 1000, levels are associated with the session, such as by selecting a control. The orientation and number of levels are specified in steps 1005, 1010. For example, FIG. 9 shows three levels arranged vertically. Next, products or, more broadly, objects, are associated with (i.e., assigned to) levels, as in steps 1020, 1025. After selecting levels for a session, a level may be designated for each browsed object. After all objects have been browsed, the user may select level view to view the objects in levels. In step 1030, the display is divided into the separate regions, including one for each level. All level assignments are stored, at least temporarily. The order in which objects are assigned is maintained, unless a user specifies a different order, such as by manipulating a list. Each level is displayed with an assigned object, in steps 1035 through 1045. Each level responds to GUI input, such as a finger swipe, as in step 1050. Displayed objects are updated in response to GUI inputs, as in step 1055. When completed with the session, a user may close the window, ending the multi-level display until selected again, as in step 1060.

A method of simultaneously displaying and arranging a plurality of photos or pictograms to facilitate browsing and purchasing decisions using an exemplary system according to principles of the invention may be implemented as an add-on, such as a plug-in or extension, to either a browser enabling smart phone application or a web browser. Implemented as an extension add-on to a browser, the methodology expands the core features of a web browser by adding one or more functional modules. These functional modules enable the collection of information and selections by a user and the display of photos or pictograms in accordance with the methodology.

Coupons may be redeemed by a user at checkout by displaying a readable barcode, optically emitting a scannable synthetic barcode, or wirelessly communicating coupon data from the mobile device to the point of sale system.

A system according to principles of the invention may include an accounting module as part of the Directive GUI 715 and/or Storefront 705. The accounting module tracks and reports financial and usage data for a consumer user, business user and system administrator. The data may include order and sales data, coupon usage data, viewing data and the like. Using the accounting system, users may learn review their usage.

The system enables sponsorships and gifting. A user may procure goods for a beneficiary using the system. Purchases may be made by a gift giver using the storefront, with delivery instructions specified for the beneficiary. Additionally, a plurality of users may team together to purchase a gift for a beneficiary. Furthermore, one or more users may sponsor products or services for a beneficiary. In the case of a sponsorship, the users agree to pay for a portion of the purchase price so that the beneficiary may purchase the goods or services for less than the full price. Thus, for example, a business user may arrange for food to be provided to a high school class or sports team. The beneficiary-consumer (i.e., sports team or class) will be notified in advance to make sure that the consumer is available and receptive to the gift or sponsorship.

In another embodiment, a consumer user may generate a directive by selection. By way of example, a search of products may produce a list of search results, which may include pictograms associated with the search results. Selection of a pictogram may generate a directive.

In a further embodiment, a user may associate a condition with a directive. By way of example, conditions may include price, discount, sale, and/or location. For instance, a consumer user may want to be notified when a particular product or service, or a type of product or service is available at a specified price or less, or is discounted by a specified percentage or dollar amount, or is available for purchase. As another illustrative example, a user may want to be notified when a celebrity is performing or otherwise appearing in a certain geographic area or is appearing on television.

In one embodiment, the system presents a user with a subject matter (e.g., a pictogram of a product) and a user-selectable control (e.g., pictogram) representing a condition or event related to the subject matter. By way of example and not limitation, the system may present a user with product information and allow a user to select a notification when a condition is met, such as a sale, amount of discount or other relevant condition. As another example, a user may select to be notified when a celebrity appears locally or on television.

In another embodiment, a user's calendar is presented, generated or updated with information relating to a particular day or time. For example, information responsive to a user's preferences and conditions may be displayed on a calendar. Such information may include discounts and special savings available at particular retailers, celebrity appearances and performances, concerts and sporting events, etc. . . . Such calendar information may be displayed on a calendar generated using the system and/or displayed on a user's calendar via a compatible calendar file. Illustratively, an .ics iCalendar file or other compatible calendar file or data stream may be sent to users to populate their local calendars with the date-related information. The process may be automated, requiring no user intervention.

A handheld mobile electronic device such as a mobile phone or tablet may be equipped with an electronic calendar application or widget. Generally, a user may plan events on certain dates of a month or a year using the calendar as well as activities within a single date. In other words, a user may customize one's own calendar by entering information to annotate a certain date or a certain time of the day. An exemplary system and method of the present invention performs the steps of synchronizing the mobile calendar with the system's calendar data storage to generate a synchronized data. In this manner, time sensitive information may be automatically calendared. Periodically (e.g., automatically when an update is available or at a determined time interval) or upon user instruction, online calendar data is downloaded from the system into the mobile device in a format compatible with the mobile device calendar application or widget, and then is integrated into the database of the calendar application/widget. In this manner, time sensitive information may be calendared and presented to a user in a timely and organized manner, before the event has passed.

Calendered events may be displayed on a mobile device by side swiping motion. For example, a series of events (e.g., events for the day, week, two weeks, month or some other time period) may be displayed in chronological order in a side to side swiping list. Thus, a user may swipe (i.e., manually input an instruction to advance) to progress through the series of events on the calendar.

The calendar subsystem may, thus, provide daily, weekly, hourly, and/or monthly alerts with date sensitive information responsive to a user's preferences presented on a calendar and viewable chronologically or in another manner. The displayed calendared items may comprise user-selectable pictograms linked to detailed information about the item/event.

Universal Centralized Consumer Driven Remote Controller according to principles of the invention provides a menu of options to operate directives for pulling advertising or marketing favorites or preferences from a data pool centralized location for viewing, buying, change notifications, or for any necessary reason. Based on choice, consumers can view instantly or for future selected viewing. As an example a user can set directives to notify them as soon as lucky jeans are 60% off or any blowout sale or the next time Elvis is in the news. Viewing and alert options may depend on the category or industry that is selected by the user behind each pictogram creating the universal consumer-driven controller. Data feeds may be supplied from different websites and companies. Consumers can even choose activity information of another location in real-time with menu of options and texting strangers for real-time, present or past environment awareness. All notifications can be time sensitive or sent as alerts to the user as advertising information or advertising change, or advertising notification becomes public.

Advertising and Marketing Data Pool and Calendar Chronological Synchronization is also enabled. A data pool of products and services information may be synchronized to the user or customer's calendar and universal centralized consumer driven remote for real-time and accurate advertising and information for viewing and buying purposes. The system may synchronize advertising logo, brand, and consumer-driven information in chronological order displaying accessible in a pictogram. Various items may be displayed in a swiping chronological order for the date advertising or marketing is selected. The calendar may display a number of options including the channel of specific shows on television or radio or new sale pricing or viewing information from advertisers.

In yet another embodiment, an exemplary system and methodology according to principles of the invention may enable user-to-user communication in the form of real-time chat, anonymous email, SMS, voice-over-ip and the like. Thus, by way of example, consumer users may ask other users for their opinions and observations regarding subject matter. A user may inquire about a hotel, restaurant, concert or the like. The system may direct the inquiry to certain or all users who have indicated their knowledge or attendance or from which their attendance may be inferred. In one particular example, a user may specify his/her patronage at a retail establishment, bar, restaurant club, sporting event, or hotel. Other users interested in the then-current conditions at the retail establishment, bar, restaurant club, sporting event, or hotel may input a directive or send a message inquiring about the condition. The directive or message may ask about crowds, parking, food, waiting times, whether a bar or club has many women or men, what the score is at a sporting event, and the like. Users who have indicated their attendance or patronage, may receive the inquiry and respond if they choose to do so. In this manner, the system provides a peer-to-peer reporting mechanism that benefits all users while maintaining a user's anonymity and giving users an opportunity to participate in a discussion or opt-out.

In another embodiment, the system includes suggestions to supplement user selections. The system suggestions may be of the same type of goods and services selected by a user for viewing. The system may generate suggestions based upon key words descriptive of and associated with goods and services selected by a user and/or input into a directive or search query. The suggestions may populate a list, including, but not limited to, a list or sequence displayed in a swipable manner.

In yet another embodiment, the system includes a random display generator. Items in a list are displayed in a random order or a machine generated order established by the system. The list may be populated with user-selected items and/or system suggested items. A user may select a control icon or swipe an icon to display another item. Thus, for example, the lists of shoes, shorts and shirts may be generated. The system may display a pair of shoes, a shirt and a pair of shorts simultaneously. The displayed items may be changed by swiping or other user input. In a slot machine manner, the system determines the next item of the list to be displayed.

Below, the text of the detailed description of parent application U.S. Nonprovisional application Ser. No. 14/058,119 filed 18 Oct. 2013 is reproduced. The drawings from the parent application are also included.

As used herein Customer=consumer, business, buyer, recipient, viewer company, vendor, merchant, employer, individual—anyone who has information, service or a product.

As used herein Customer or consumer is anyone pushing or pulling any form marketing, advertising or receiving any form of marketing or advertising.

As used herein Company=business, merchant, seller, vendor, employer, agency, Individual, organization, non-profit that has a product or service to sell or for Marketing purposes to other consumers, customers, or companies.

As used herein Employer=hiring manager, staffing agencies, company.

As used herein Consumer=user, viewer, recipient, buyer, candidate.

As used herein all words in the present invention can be singular or plural.

As used herein Distributions is delivering.

As used herein Publishing is creating.

As used herein Pull or pulled or driven marketing self-driven marketing, customer or consumer driven marketing, wants and needs that are controlled by the customer for automatic distributions from the company.

As used herein Promos is Promotions, promotional offers, promotional codes.

As used herein the Universal Centralized application is equal to but not limited to: digital application, stored data, automated application, profile, data page.

As used herein the Universal Centralized Application is a database that can be used in many variations but not limited to where customers or consumers or companies can digitally upload, use an interactive and interchangeable check box matching and synchronized system, or check any personalized information, demographics, marketing, events, any information, and resumes for other companies, consumers, or customers can pull, push, drive, share, target market, notify, alert their information, marketing, promotions, discounts, needs, wants, likes, product or services awareness. Can be used to receive or deliver and subscribe and unsubscribe. The application triggers the repository.

As used herein the Universal Check Box is A controlled and organized filter in the system where the Customer's Universal Centralized Application contained information matches and synchronizes with the marketing material of the company's Universal Centralized Application or Universal Centralized Repository to distribute, pull or deliver marketing information back to the consumer's universal centralized repository which also matches, links, and synchronizes with the company's marketing material and system. All for the customer to view on their digital communicator. This also means to subscribe and unsubscribe in a check box method.

As used herein Marketing is any kind of information, advertising, coupon, promotion, discount, product and service awareness, personal information, person, company information that can be used in some fashion by the customer or company.

As used herein Customer Driven Discounts is customer driven marketing, advertising, coupons, promotions, and discounts pulled by the customer for redeeming or savings to their digital communicator.

As used herein Customer Driven Target Marketing is marketing, advertising, promotions, and discounts sent from companies based on the customers consent, demographics, likes, needs, favorites, pull.

As used herein First to know Marketing is When private information or marketing is made public information or marketing for the very first time from a company, artist, customer, or agency for the receiving consumers or customers who have the promotional items checked in their universal centralized application to be notified first of such information or marketing.

As used herein a Universal Identifier Code, coupon code, personal code, discount code is equal to but not limited to: credit cards, magnetic cards, electronic cards, any platform, numerical codes, alphabetical codes, QR codes, barcodes, any scan code, laser code, any code, or any satellite based technology linked to the consumer, customer, company, product or services.

As used herein an Any Digital Communicator or digital device is equal to but not limited to: computers, web-based technology, cloud based technology, satellite-based technology, smart-phones, IPADs, android technology, apple technology, Blackberry, credit cards, magnetic cards, electronic cards, any platform, numerical codes, alphabetical codes, QR codes, barcodes, any scan code, laser code or laser technology.

As used herein a Universal Centralized Repository is a computer-based system and database where marketing, advertising, demographics, personalized information, discounts, coupons, any needed information, data, promotional offers, promotional codes, product or service awareness, can be stored, utilized, pushed, pulled, received, delivered, published or distributed to or from any consumer, customer, or company for but not limited to loyalty, new product awareness, redeeming discounts, marketing notifications via any digital communicator and platform. All paper forms of such direct mail, free standing inserts, advertising, or informational communications will be transformed and digitized in a laser like way to customer's digital communicator for viewing, redeeming, or informational purposes.

It must also be noted that As used herein and in the appended claims, the singular forms "a", "an", and "the" include plural reference unless the context clearly dictates otherwise.

Embodiments of the present invention are directed to a computer-based, online system 10 comprising:

A universal centralized application 80 and repository 20 for all consumers to seek, inquire, pull 24, push, drive, be notified, receive, view and receive marketing for any or favorite 122 discounted product or service, rewards, promo codes, promotional offers, product and service awareness, advertising notifications, needed and necessary information notifications or awareness of any kind from any company;

A universal centralized application 90 and repository 30 for any company to access, seek, push, pull 24, drive, find, survey, market, create, publish and distribute discounts for consumer's favorite 122 products and services, rewards, discount notifications and awareness, promotional offers, promo codes, advertising notifications and awareness, product and service notifications and awareness, information notifications and awareness to or for any consumer or any company the seeking company wants 14 to target in the system 10 or who is part of the network;

A link, access, delivery system, consumer driven 24 target marketing system, company driven 24 marketing system, customer 12 driven 24 marketing system, distribution system 10 or channel or portal not limited to the consumer's computer, internet, smart-phone, iPad, cell phone, television set, car, digital media, any digital platform, printable paper coupons for instant real-time discount savings redeeming, and notifications, marketing, digital marketing, information awareness, digital awareness; also for instant or real-time advertising, promo code, information, promo offers, product and service notifications and awareness;

In one embodiment, this is a universal coupon, discount, promo offer, promo code, notification, advertising, information, marketing and distribution system 10 that uses a bar code, electronic strip, magnetic strip, coupon, advertising, discount, identifier code 36, repository 20 address or site, marketing page, GPS, any digital media, any digital communicator 50 that targets or communicates to the consumer or customer 12 directly from any company not limited to manufacturing, retail, or marketing and distribution companies.

Our computer based method and system 10 allows companies or businesses to direct target market the end-user or consumers in real-time not limited to promotions, coupons, discounts, advertising, using a consumer personal bar code, identifier code 36, promo code, electronic strip, magnetic strip, digital platform, any scanning surface, media, gadget or digital device. Promotional codes, discounts, coupons, advertising, can be redeemed or used by but not limited to the bar code, identifier code 36, smart phone, key tag, any portable device, or any digital device.

Each customer's personal bar code, digital communicator 50, electronic strip, identifier code 36, or magnetic strip will have a set of numbers or Identifier code 36 that is specifically assigned or belongs to the customer 12 for redeeming and notification purposes. Each consumer's personal bar code, coupon barcode, discount barcode, advertising barcode or code, identifier code 36, magnetic strip, electronic strip, smart-phone, and key tag, is mapped to many discounts, coupons, promo codes, promo offers for redeeming or savings.

Each company can specifically deliver, distribute, push or notify coupons, discounts, promo offers, promo codes, advertising, or information, to any consumers personal coupon, discount, promo code, notification, advertising, or information of value to any smart-phone, iPad, satellite, web-based device or system, cloud-base system 10 or device, barcode, code, repository 20 and organizer marketing site in our system, and collect data that is specifically to each consumer or customer. The company must upload product and service photos, create product and service detailed information, advertising, and discounted products and services once in our system, and then utilize our system 10 to create, change, publish, or distribute discount types, view real-time data, create rewards, re-issue discounts on products and services, view current discounted products and services created in system 10 and on display, create instant alerts, deliver and distribute in real-time anytime they choose without reprinting. They can also create detail information about the product, service, coupon, discount, advertising, information, in our system.

In the same embodiment, one Identifier code 36 is used for each consumer. During the time of check out or redeeming, the consumer will activate or use their personal identifier code 36 for every coupon, discount, promo code, advertising, information, or notification sent, delivered, or distributed to them by the company for any or all products or services for scanning or redeeming via but not limited to smart phones, scanning for savings, receiving rewards, re-issuing of discounts or coupons, advertising notifications.

In the same embodiment, the method and system 10 describes our company will have a company driven 24 marketing system 10 where companies can access, pull 24 or drive consumers or customers or businesses to them that fit their product or service for marketing distribution, information awareness or notifications, product and service awareness or notifications. These companies can use product or service information, company information, from any company. These companies can also use keywords to seek, pull 24, and drive the right company, consumer, or customer 12 to their product or service.

In another embodiment, the method describes each company will have an Identifier code 36, source code or set of numbers that specifically belongs to their company and each promotional item, coupon, discount, product, and the discount each product is providing. One product can have more than one discount type or promotional code. Example: (10% off, 50% off, 2 for 1, etc.) The Company can decide each day, week or month how they want the discount or coupon used and who they want the discount or coupon to be issued too. Each company will have its own coupon, promotional, and discount marketing page or landing page or centralized repository 20 where they can create a bio for their company, create coupons, discounts, advertising, marketing and upload or send pictures or photo's that represent each or any product or service they are selling or promoting. Each coupon item, discount item, or promotional item will automatically be issued a source code or bar code each time a product or discount is created.

In yet another embodiment, this a universal coupon, discount, promo offer, promo code, notification, advertising, information marketing and distribution system 10 that allows any company to upload product and service photos, create product and service detailed information, advertising, and coupons once in our system, and then utilize our system 10 to create, change, publish, or distribute discount types, view real-time data, create rewards, re-issue coupons, view current coupons on display, create instant alerts, deliver and distribute in real-time anytime they choose without reprinting.

In this embodiment, we use the company's 16 coupon bar codes in our system. During the time of check out, the consumer will pop-up or search the coupon, discount identifier code 36, identifier code 36, or bar code on but not limited to the smart-phone screen, digital identifier code 36, identifier code 36, paper printer, and redeem, scan it for savings, receive rewards, re-issuing of discounts or coupons, advertising notifications, information notification.

Every company will have a marketing page to create, publish or distribute. Companies can list its coupons, promo's, discounts by digital number, identifier code 36, or bar code authenticating the coupon or discount the company wants 14 to use. After the company uploads product photos and create or publish marketing for automatic distributions, our system 10 will automatically display and generate the coupon and discounts to any consumer the company wants 14 targeted, by communicating with the consumers universal identifier code 36 or personal coupon, discount, advertising universal repository 20 site and organizer.

In one embodiment, the method and system 10 is described to be an option where no coupons are collected, and no detailed accounting is needed to divide reimbursements for discounts between the retailer and various manufacturers. The method allows any discount offer in the repository 20 that can be redeemed with a purchase is used with or without the consumer's knowledge.

The method will give retailers the option to let our company or the system 10 handles all couponing or discounts and let our company or system 10 deal or communicate directly with the manufacturers. A single invoice is delivered to the manufacture or service center for collecting discounts.

In the same embodiment, only manufactures, retailers, and service companies selected by the consumer may offer discounts. Only products and services the consumer request can be offered. The distance a consumer will travel to take advantage of an offer can be set by the consumer so offers too far away are filtered.

In the same embodiment, consumers can receive all offers from any company who has a sale or discount or coupon on any product or service, and redeeming is automatic at check-out or point-of-sales without looking at their personal centralized universal repository 20 or discount and coupon organizer.

In the same embodiment, the method and system 10 is described for discounts not to be rewarded at point-of-sales or for consumers to pay all discount or coupon savings up-front or at the time of check-out, and receive the savings in the form of but not limited to a discount, check or direct deposit. Consumers can get discounts, coupons, promotional offer, codes, and redeem them with or without knowing, or with or without checking their centralized repository 20. Each consumer's personal bar code, identifier code 36, magnetic strip, electronic strip, smart-phone, and key tag, is mapped to many discounts, coupons, promo codes, promo offers for redeeming or savings. Company discounts, coupons, promotional codes, promotional offers can also be redeemed using the company's 16 own not limited to codes, barcodes, magnetic cards, and credit cards.

In another embodiment, for companies, coupons, promotional items, and discounts can be programmed or set to be used anytime for 1 day, 1 month, all year, etc. Businesses can set expiration dates to any coupon, promotional code or discounts.

A company can target as specific as issuing coupons or special discounts for pizza to the graduating high school seniors of the local neighborhood for today only. Coupons or discounts can be created instantly.

Our method will be much secured. Our system 10 will prevent duplication of coupons from thieves. Coupons can be deleted after use. We will provide accuracy of coupon use. All companies in our system 10 will have a complete count on the number of coupons used, the number of coupons displayed, and the number of coupons issued to customers individually and as a whole.

With our method, Company coupons or discounts issued can be programmed to alert the end-user or customer 12 to his or her satisfaction or likes. With First to know 14 marketing, if a customer 12 wants 14 to know every time Lucky jeans are on sales for 50% off, they can.

Our method and system also will give the company that is advertising, marketing, issuing discounts, coupons, promotional codes etc. . . . A way to store, print, view, or display a list of the customers that he or she has or is targeting. This way companies will be able to confirm the identification of the customers by the targeted list and the customer's personal identification code.

As the customer ruses the coupons, discounts, or promotions, the offer can be programmed to go away or programmed to be taken out the company's 16 system, depending on how the company programmed the coupon or discount.

If a customer 12 visits any store, restaurant, etc., the system 10 will allow the customer 12 to either type or scan in their user name, identifier code 36, digital bar code number, alphabetical code, numerical code, GPS, password, company visiting or product which will automatically logged them into their landing page or tell them instantly if they have a coupon, discount, or promotional item at that particular company at that particular address. This method is also uses voice activation 24 to pull 24 marketing from the repository 20. Voice activated 24 personal assistant locate all or any discount, promotion, advertising, or coupon inside your universal centralized repository 20 and display it on your digital device or communicator for viewing, redeeming, notifications and informational purposes from any or many companies.

In another embodiment, the method and system Will also allow customers or consumers to search, drive, or pull 24 a price quote with or without discounts from any products from one company or many companies representing the same or similar product and service. The customer or consumer can set the system 10 to alert or notify them when the product or service meets a certain price discount. This consumer driven 24 retarget marketing or discounts can be pulled 24 from multiple companies who sell the same product and service for consumers or companies who need to buy the product within a certain time frame. Those time frames can be now, tomorrow, within the week, within the month, or within the year. The system 10 can pull 24 a price check from multiple companies on the same or similar product and service as soon as the consumer or customer 12 needs it or the system 10 can alert or notify the consumer or customer 12 when the discounted price is met from the first company that meets the wanted price from the consumer or customer.

In another embodiment, we have invented the method and system 10 to validate, recognize, and redeem use of discounts, coupons, promotional offers, and promotional codes at check out or point-of-sales at any physical company or internet company.

In this method, the consumer, customer, or company receives a digital coupon, discount notification, advertising, marketing, information, promotional offers, and promotional codes of any kind through or via a smart-phone, computer, web-based device or application, blackberry, cloud-based device or application, android, and I pad. Once the consumer, customer 12 or company wants 14 to use, view, redeem a discounts, coupon, promotional offer, or promotional code for savings or purchase the consumer, customer, or company will:

Activate the coupon, discount, promotional offer, advertising, code, or information by numeric or letter code, activation trigger, or by a touch screen press and hold button or spot on the particular or specific coupon, discount, promotional offer, promotional code, code, advertising, marketing, and information that is displaying or pulled up on the screen of the smart-phone, I pad, blackberry, android application, digital device, computerized web-based device or system, cloud-based device or system. Once the smart-phone, I pad, androids or web and cloud-based devices or units are triggered or activated by code or touch, the mobile digital unit, smart-phone, I pad, android, blackberry will trigger or activate GPS (Global Positioning system), which will activate our mobile universal centralized repository 20 system 10 or any system 10 to recognize or validate the company or the location of the company the coupon, discount, product, service, promotional offer, or promotional code is being used, redeemed, or purchased. The activation of the coupon, discount, promotional offer, or code will also activate or trigger the GPS to simultaneously, real-time, or instantly to activate the universal centralized repository 20 or database system 10 or any mobile web-based computerized system, device, or system 10 to recognize, validate, confirm, concur, collaborate, match, group, and organize the digital coupon, discount, promotional offer, and promotional code with the consumer's smart-phone, I pad, android, web or cloud-based device, which in turns alerts, recognizes or triggers the customer, company, or consumer who owns the smart-phone, I pad, mobile phone, android mobile device, mobile web-based device in our system 10 for notification and validation. When the consumer activates the discount or coupon at the store or company, the system 10 will activate real-time by the consumer's smart-phone via GPS and the company. The company will record real-time of the purchase in their internal system 10 by computer and receipt. Our company will then match up real-time of the purchase from the companies print out to the real-time the discount or coupon was activated on the smart-phone to determine a valid purchase. If the time of the activation of the smart-phone, does not match the purchase of the product or service in the company's 16 system, then it will be determined that the activation of the discount or coupon was pressed accidentally or pressed prematurely.

In the same invention, the company will have a Hotspot Wi-Fi signal that is addressed and linked to that company's 16 point of sale system 10 or not linked to the company's 16 point of sale system. As the consumer activates the discount or coupon for redeeming purposes at the point of sales, the hotspot will intercept the consumer's GPS activation signal for confirming the coupon or discount activated matches or validate the stores hotspot signal. Hotspot will recognize activation close proximity. Activation of the coupon or discount must be done in front of the store representative at the point of sales. The store representative or consumer could also enter a numerical code or alphabetical code to finalize the redeeming of the discount or coupon. Once the code is entered, the finalization of the activation will notify the manufacturer, retailer, and our system 10 of but not limited to, which discount was used, what product or service, time, date, year, customer 12 who used it, and company is was used at.

In this sequence of validation, our internal system 10 will know exactly who bought or purchased the product or service; the discount, coupon, or promotional offer or code that was used; the company or companies to whom the discounts, coupons, promotional offer, codes, or product and service were linked to; the customers or consumers the coupons, discounts, promotional offers, or code were linked to Each activation of such coupons, discounts, promotional offers, or codes at the company or vendor will instantly link: smart-phone, I pad, android, or mobile web-based device which the customer 12 or consumer who owns it; the company's 16 location, the company's 16 name, and the companies who coupons, discounts, or promotional offers that were activated or triggered, and the consumer's or customers source code to whom the coupons, discounts, or promotional offer were used by, redeemed by or distributed to. The collaboration of all data is not limited to who bought the product, who redeemed the savings, the place or company where the discount or coupon was redeemed or purchased, time, date, rewards, automatic re-issues of discounts, all demographic or personalized information on the company, consumer, and customer Will be collected in our internal system 10 or any system 10 or the universal centralized repository 20 system.

Numeric or alphabetical codes may be entered by the company representative.

Receive a source code or identification code or promo code, item code for discounts, coupons, promotional offers or codes for web-based internet companies. Each company's 16 website will have a link to the universal centralized repository 20 or database in the form of a username, password, and discount or promotional code at check out. Once the username, password, and discount code or promotional code is confirmed or validated, the customer's, consumers, or buying company's 16 location or website is automatically recognized, the purchase is automatically recognized, and the collaboration, grouping between the discount, consumer, company, customer, demographics, personal centralized repository 20 all concurs and organizes in the universal centralized repository 20 system 10 or database.

In another embodiment, In the same method and system, there will be a centralized marketing repository 20 for consumer's demographics, companies, staffing or recruiting agencies, potential employees, employers, resumes, applications, and employment information.

The problem in the recruiting world is the staffing agencies or employers can never find the exact match for their job posting or job descriptions. A lot of searching through resumes and a lot of scanning is what most recruiters or hiring managers do so often. Companies go weeks and sometimes months trying to find the right candidate. Now they can find them instantly with the click of a button In another embodiment, the present invention is an improved method on how recruiters, hiring managers, or companies search for the perfect candidates and hiring them. The method also improves the way candidates find jobs or careers. The world is too big. For the recruiter, It's has become increasing difficult to find the right candidate for a job description. For the candidate, it has become increasingly impossible to know who is hiring exactly for the qualifications that you possess or who is hiring part-time, who is hiring full-time, or who is hiring Interns. The present invention utilizes the Employer Driven 24 Resumes and Resume Driven 24 job descriptions or careers as the method. Both are marketing Items for the other.

This creates a one stop for employers to digitize their job descriptions to find the most near perfect candidate for the job, and for the candidate to find the most near perfect job or career that matches their resume no matter where at in the world. The system 10 will have certain filters for the candidate to notify what city, state, or country he or she is willing to work, and for the company to pull 24 candidates from other states that have their filters on to relocate. The present method and system 10 is paperless as the candidate and the employer never has to print resume.

Within our universal centralized repository 20, there will be a centralized repository 20 where all those looking for employment will digitize their resume onto our system. The digital form resume will have a check box and summary area where the Candidate, potential employee, applicant, or job applicant can post or check information not limited to the precise skill set, years of experience, job description, field of degree, software skill.

The digital resume can be stored online and updated occasionally for all employers to use as pull 24 or company driven 24 marketing. Qualifications, skill set, certifications, years, experience, degree, major, college, and university can be set or pull 24 resume by, pulled 24, pushed, drop down box, search, and check box. Candidate can also can be sent an alert on any job description matching his or her resume.

The hiring companies, employers, or recruiting and staffing agencies will be able to use a digital form to load or enter information not limited to the job posting, qualifications, certifications, skills required, years required, software requirements, field of degree or description by check box and summary, The centralized repository 20 or database allows companies that are sign-up can use our system 10 to pull 24 or drive consumer's, customers or potential employee's resumes, applications or bios directly to them that are the closes match their job posting. Our internal system 10 will match up every key word that is a close match or better, and rank them accordingly by not limited to the overall most compatible resume match, local resume match, and national resume match. Customer 12 or potential employees will have a place on the system 10 that indicate whether they want to be considered just locally or consider in any city or cities, or state or states, or country they choose. Each hiring manager or recruiter can have their own recruiter page that ranks and pull 24 candidates for the hiring manager or recruiter's specific job postings and list it on their own employment page. Information of each recruiter or hiring manager on candidates can be shared with their team members, transferred to another recruiter, or seen by the manager.

The employer, recruiting or staffing agency, or company driven 24 marketing method can receive match notifications or alerts delayed, instantly or in real-time on their computers, web-based devices or systems, cloud-based devices or systems smart-phones, ipads, androids, and blackberries on any potential employee that is part of our system 10 or signed up in our network.

This allows the companies to have a higher percentage chance of finding the perfect or near perfect match of a person, candidate, potential employee, or resume for their job posting, companies, or clients.

This also allows the company to have a wide variety database or repository 20 to choose or pull 24 applicants, resumes or potential employees from much bigger than the leading resume posting site.

The applicants of potential employees can receive delayed or instants real-time alerts and notifications not limited to interview request, company or agency notifications, interview appointments, and job posting or information.

The companies, employers, or agencies can also be pulled 24 from the consumer's candidates, or potential employees. Potential employees can drive or pull 24 job posting that are posted directly to their employment repository 20 with alerts and notifications or as a match or close match.

Every company, employer or agency can send out interview notifications or alerts to any potential employee or job applicant of their choice. Interviews can take place online or in-person.

In another embodiment, the companies, staffing or recruiting agencies, colleges, hiring managers or employers that are in the system 10 or network can pull 24 or drive students, applicants or potential employee's resumes, applications or bios to directly match closely to their job posting or internship positions. Our internal system 10 will match up every key word that is a close match or better, and rank them accordingly by not limited to company's 16 or employer's overall needs, most compatible resume match, local resume match, and national resume match. Students, applicants, candidate or potential employees will have a place on the system 10 that indicate whether they want to be considered just locally or consider in any city or cities, or state or states, or country they choose.

The employer, recruiting or staffing agency, college or company driven 24 marketing or recruiting method can receive match notifications or alerts delayed, instantly or in real-time on their computers, web-based devices or systems, cloud-based devices or systems smart-phones, iPad, androids, and blackberries on any potential employee, Candidate, student, or applicant that is part of our system 10 or signed up in our network.

Employers, companies, students can also push information.

We will also create the universal centralized repository 20 for resumes and job postings. Where consumers or customers can have a single or multiple digital applications stored online in the repository 20, but can be pulled 24 or pushed or converted to any company's 16 digital job posting. The company can also just use the system 10 to alert students, candidates of specific job postings that match their resume. Both job posting and resume are both digital with linked, matching, and synchronized controls or triggers.

In the embodiment, or in the same invention, there will be a universal family or customer shared centralized repository. In this invention, consumers or customers will be able to share all pulled, push or customer driven marketing from any family member, customer, franchisee, and subsidiary that is a member. This plan will be created at the beginning of the customer's first day of membership or the customer can be added as a shared customer of another customer that is a family member, subsidiary, franchise, or owner of the new member customer.

If one customer uses another consumers discount, coupon, or promotion that particular marketing discount will be deleted from the consumers account. The marketing discount will transfer to the customer requesting the discount before being used and before the marketing discount is deleted out of the repository.

This invention is in need for those who shop or want to purchase products or services for other family members, but need the marketing discount. This can also be used for those who actually like to try a marketing discount from another family member that they do not have. Once the transfer is made, the company will know who to send other discounts to or who has just been added as a target market.

In another embodiment, if 1000 coupons or discounts is issued, then first 1000 coupons or discounts in area will validate, the rest will show invalid. Company can still issue additional to special coupons, discounts to customer then only so many will validate, if company pay early, and only so many coupons were triggered then refund is issued. Trigger data from smart-phone will show in real-time. If our system showed many triggers but only so many products or services were bought (so the company in this case will show that they are owed more than they really are, the system will cross check actual triggers to the money owed, and make the necessary corrections.)

If our system just allow the first 1000 discounts, or push it to 1000 discount customers in the area or wherever, then 1000 will go through, savings to customer will never go over 1000 discounts. If the customer pushes coupon button he or she loses it. It will be either fewer savings owed. There won't be more triggers pushed because only so coupons or discounts are going out. Maybe we can use 1 push on the mobile per customer. Shows customer has looked at ads, used discount, store used at, and who used it. The company can Issue 5000 discounts or coupons and validate the first 1000 coupons or discounts.

Payment method for preventing fraud for the manufacturer—Method where the manufacturer will pay our company prior or in advance, equal to the same number of digital or paper coupons, discounts, or promo offer savings that they will publish and distribute to the consumers or customers. The money will be paid in advance to our company from the manufacturer and then paid to the retailer. The retailer will discount or issue a savings to the consumer or customer at POS. If the sum of the total savings paid in advance from the discounts, coupons, promo offers is not met, then a refund for the remaining balance or savings will be issued back to the manufacturer. This method is to prevent fraud in the present invention.

Payment Method for preventing coupon or discount fraud for the retailer or company—Method where the retailer or company will pay our company prior or in advance, equal to the same number of digital or paper coupons, discounts, or promo offer savings that they will publish and distribute to the consumers or customers. The money will be paid in advance to our company from the retailer and then paid back to the retailer when the retailer issue the discount or issue a savings to the consumer or customer at POS. If the sum of the total savings paid in advance from the discounts, coupons, promo offers is not met, then a refund for the remaining balance or savings will be issued back to the retailer or company. This method is to prevent fraud in the present invention.

The Location-Based Consumer Driven Universal Centralized Marketing and Distribution system is also utilized to deliver Fan Driven Celebrity appearances, gossip, and news as well as any type of news or information. Fans or consumers will be able to choose the celebrities they want to follow utilizing the Universal Centralized Application. Once chosen, the fans or consumer will receive Celebrity appearances and news alerts from their favorite celebrity no matter where the Celebrity may be in the world. The system will be able to alert or notify the Fan or Consumer the time, date, channel, or any information about the Celebrity appearance, gossip, or news not limited to any television appearance, venue, event, movie, magazine, newspaper and radio with the options to be based on location. Notifications can be delivered in not limited to video, photos, storytelling, news, and caption.

Radio, television networks, magazine, newspaper, venues, night clubs, or any company that will have celebrities visiting or appearing past, present, or in the future in any form to their business or company will have a centralized application to submit and distribute celebrity appearances, gossip or news to the celebrities followers.

Linked and synchronized to each Centralized Application will be a marketing repository and advertising distribution platform that will show all open and placed advertising spots for every appearance, gossip, or news where advertisers can place advertising based on the celebrities and their followers and/or the follower's demographics 24/7.

All advertising placements will be maintained by ReDisco and all revenues from the advertising will belong to ReDisco.

The television networks, radio stations, and magazines will be able to use this system for free to only deliver notifications or alerts of fan driven celebrity appearances, gossip, and news.

Method is designed to increase viewership for the radio, networks and magazine during the time the celebrity is appearing or being mentioned. The method will also increase the advertising dollars, because the number on viewership will increase. The advertisers and networks will now have a better understanding on exactly who is watching the show at the time it is being aired.

The other method is for the advertisers to receive better knowledge about its target market based on who is viewing at the time of the appearances or news.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A computer-implemented consumer driven centralized marketing methodology, comprising steps of:

receiving from a first user via a first programmed computing device a first directive, said first directive including a first condition and identifying the first user and identifying a first subject matter of interest to the first user, the first condition comprising a condition from the group consisting of a price condition for the subject matter of interest, a pricing discount for the subject matter of interest, a location condition for the first subject matter of interest;

receiving from a second user via a second programmed computing device a second directive, said second directive including a second condition and identifying the second user and identifying a second subject matter of interest to the second user, the second condition comprising a condition from the group consisting of a price condition for the subject matter of interest, a pricing discount for the subject matter of interest, a location condition for the second subject matter of interest;

after receiving the first directive and the second directive, creating a system-generated marketing directive, said system-generated marketing directive identifying a marketed subject matter and including a marketing object, the marketed subject matter and marketing object being supplied for the system-generated marketing directive from a remote computing system by a web crawler after receiving the first directive;

after creating the system-generated marketing directive, using a third programmed computing device to determine that the first subject matter of interest of the first directive matches the marketed subject matter of the system-generated marketing directive, and to determine that the second subject matter of interest of the second directive does not match the marketed subject matter of the system-generated marketing directive;

after determining that the first subject matter of interest of the first directive matches the marketed subject matter of the system-generated marketing directive and the second subject matter of interest of the second directive does not match the marketed subject matter of the system-generated marketing directive, making available to the first user, via network communication, to the first programmed computing device, a copy of the marketing object; and displaying the marketing object on a display of the first programmed computing device, said marketing object comprising a pictogram initiating an online transaction.

2. The computer-implemented consumer driven centralized marketing methodology according to claim 1, said system-generated marketing directive including a unit limit, and said methodology further comprising steps of determining a number of copies of the marketing object of the system-generated marketing directive distributed, and ceasing further distribution if said number of copies is not less than the unit limit.

\* \* \* \* \*